United States Patent [19]

Pomerene

[11] 4,295,193
[45] Oct. 13, 1981

[54] MACHINE FOR MULTIPLE INSTRUCTION EXECUTION

[75] Inventor: James H. Pomerene, Chappaqua, N.Y.

[73] Assignee: International Business Machines Corporation, Armonk, N.Y.

[21] Appl. No.: 53,567

[22] Filed: Jun. 29, 1979

[51] Int. Cl.³ .............................................. G06F 7/00
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,346,851 | 10/1967 | Thorton et al. | 364/200 |
| 3,544,973 | 12/1970 | Borck et al. | 364/200 |
| 3,704,448 | 11/1972 | Osborne | 364/200 |
| 3,771,138 | 11/1973 | Celtruda et al. | 364/200 |
| 3,771,141 | 11/1973 | Culler | 364/200 |
| 3,815,095 | 6/1974 | Wester | 364/200 |
| 3,886,523 | 5/1975 | Ferguson et al. | 364/200 |
| 3,893,084 | 7/1975 | Kotok et al. | 364/200 |
| 3,932,845 | 1/1976 | Beriot | 364/900 |
| 4,025,771 | 5/1977 | Lynch et al. | 364/200 |
| 4,112,489 | 9/1978 | Wood | 364/200 |
| 4,128,880 | 12/1978 | Cray | 364/200 |

OTHER PUBLICATIONS

Sofer et al., "Parallel Pipeline Organization of Execution Unit", IBM TDB vol. 14, No. 10, 3/72, pp. 2930–2933.

*Primary Examiner*—Mark E. Nusbaum
*Assistant Examiner*—Eddie P. Chan
*Attorney, Agent, or Firm*—Jack M. Arnold

[57] ABSTRACT

A computing machine for concurrently executing instructions that have been compiled into a multi-instruction word comprised of a group of n instructions, where n is an integer. The group must not demand more than a predetermined number of data and instruction fetches, or more than one store operation. If a branch instruction occurs, it must always be at the end of the group. Each instruction utilizes a different set of data for purposes of instruction execution.

6 Claims, 35 Drawing Figures

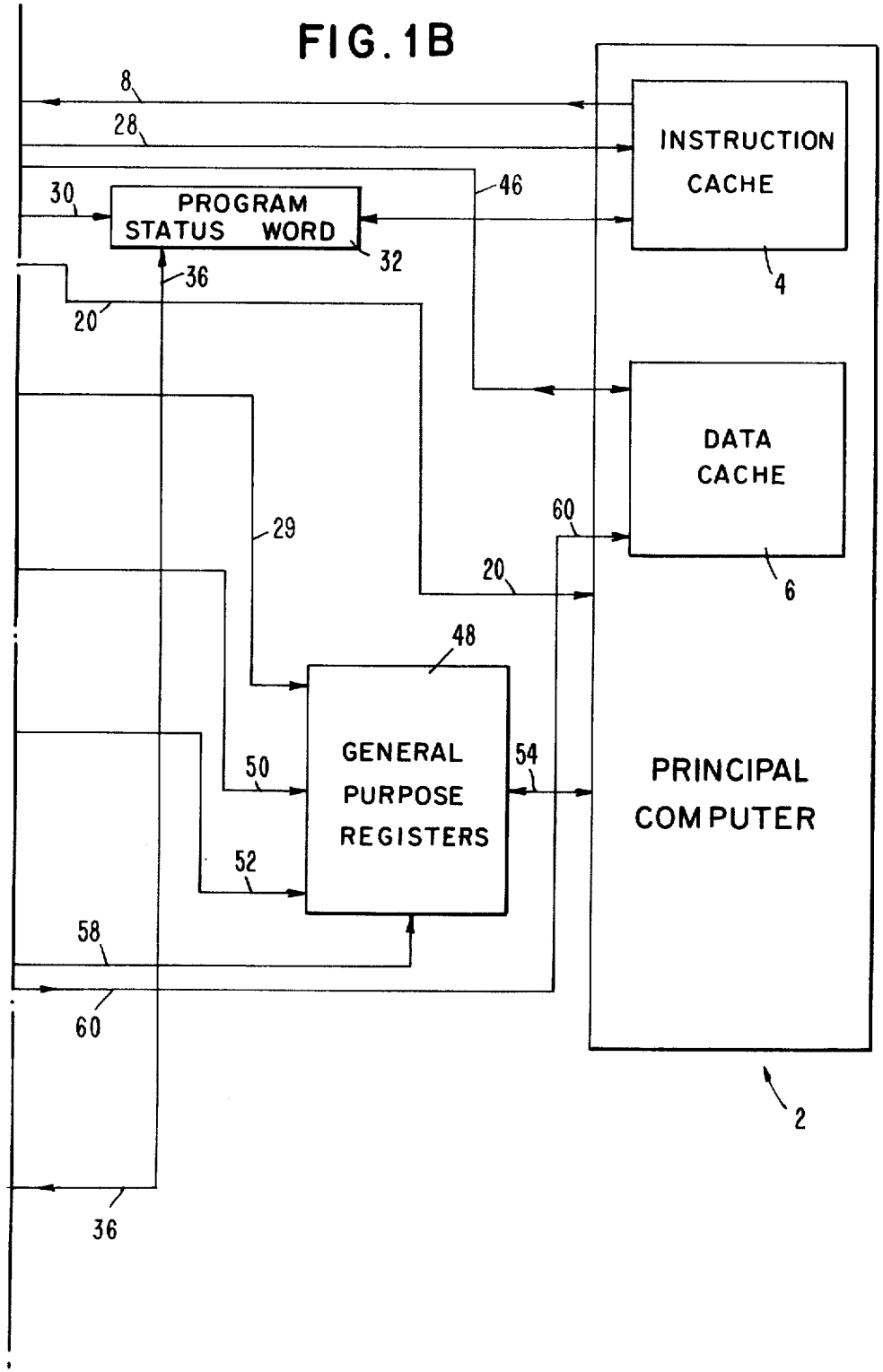

FIG. 4

|  |  |  | FIG. 4A | FIG. 4B | FIG. 4C |
|---|---|---|---|---|---|
|  | FIG. 4D | FIG. 4E | FIG. 4F | FIG. 4G | FIG. 4H |
|  | FIG. 4I | FIG. 4J | FIG. 4K | FIG. 4L | FIG. 4M |
| FIG. 4N | FIG. 4O | FIG. 4P | FIG. 4Q | FIG. 4R | FIG. 4S |

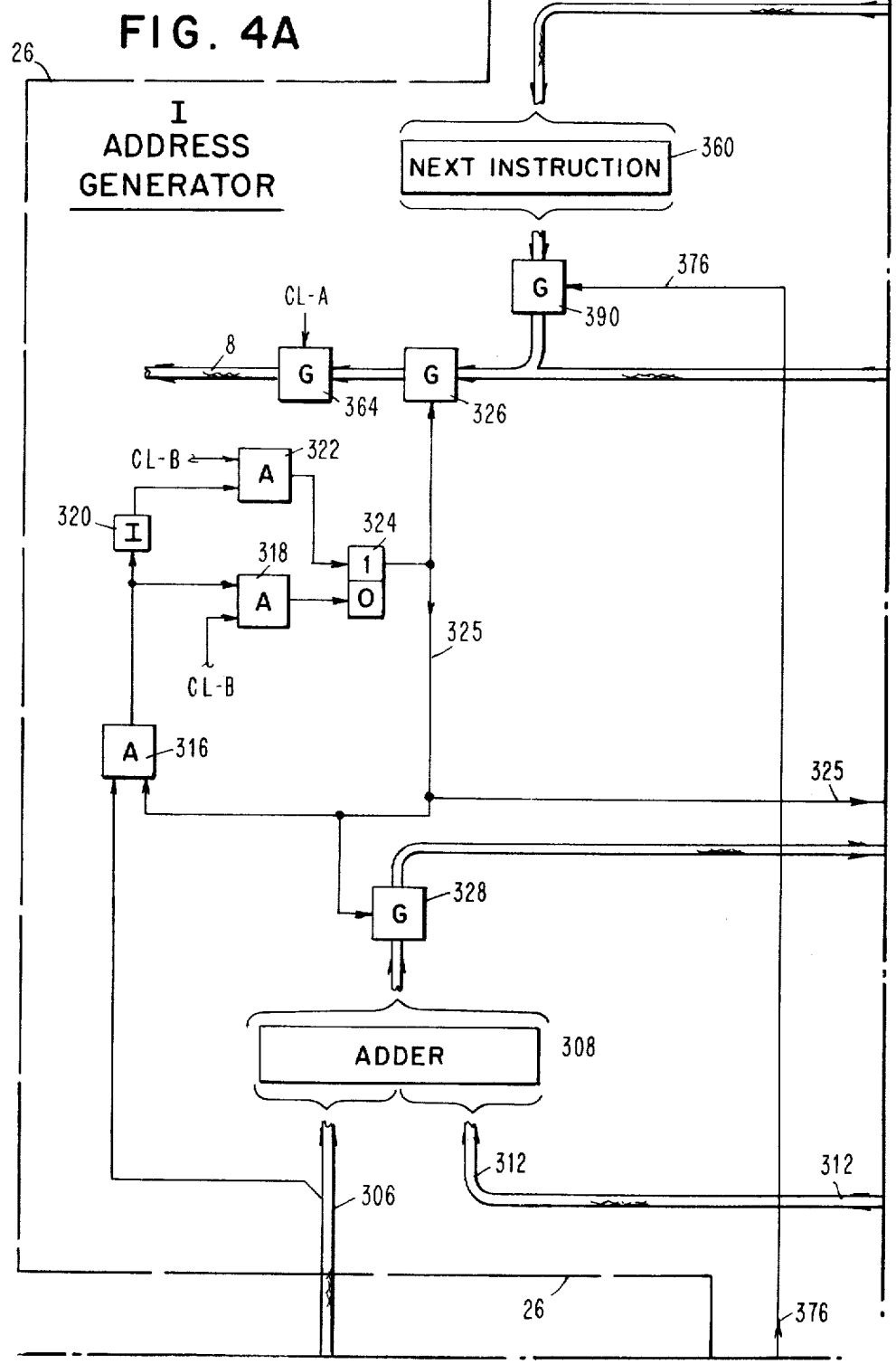

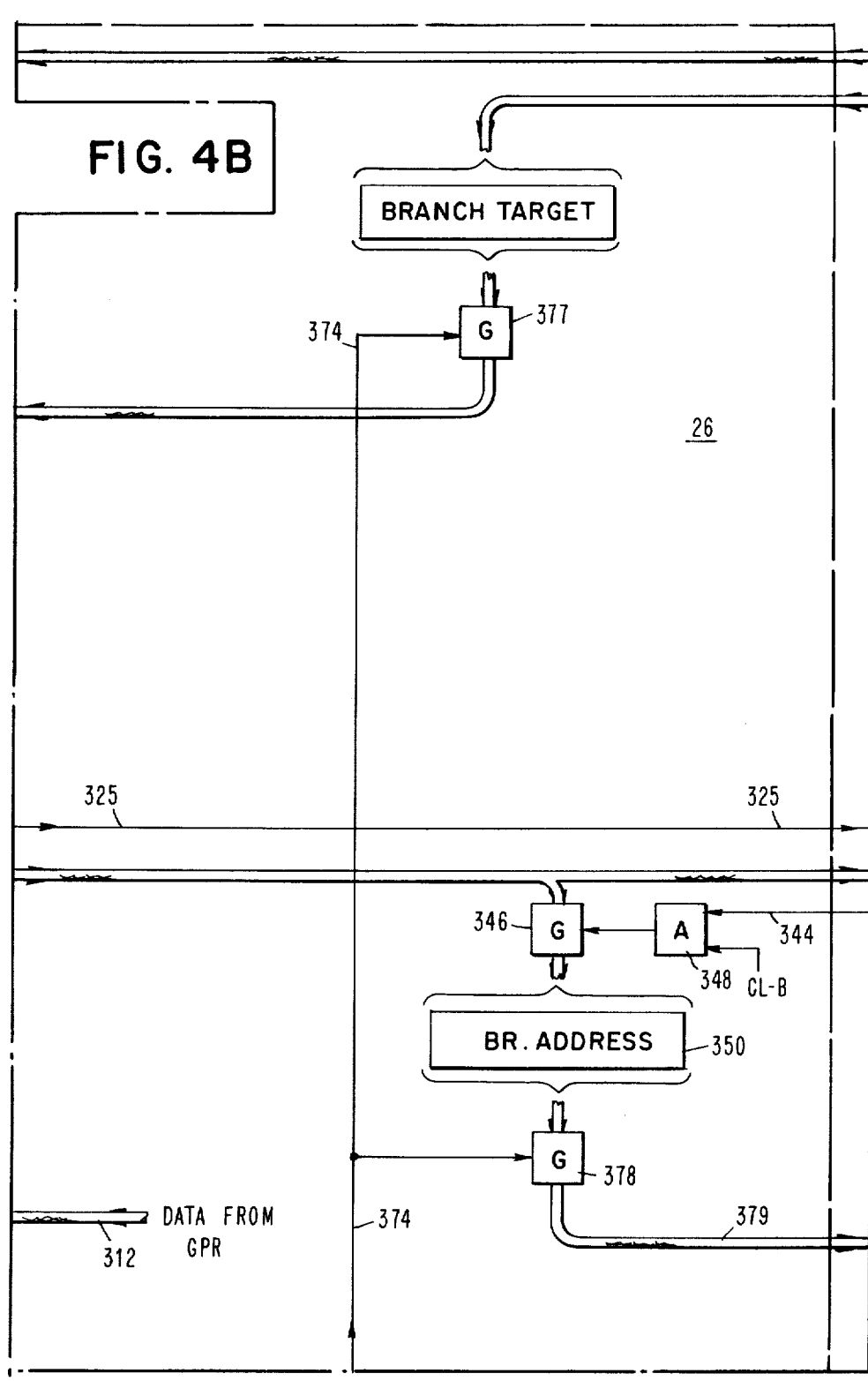

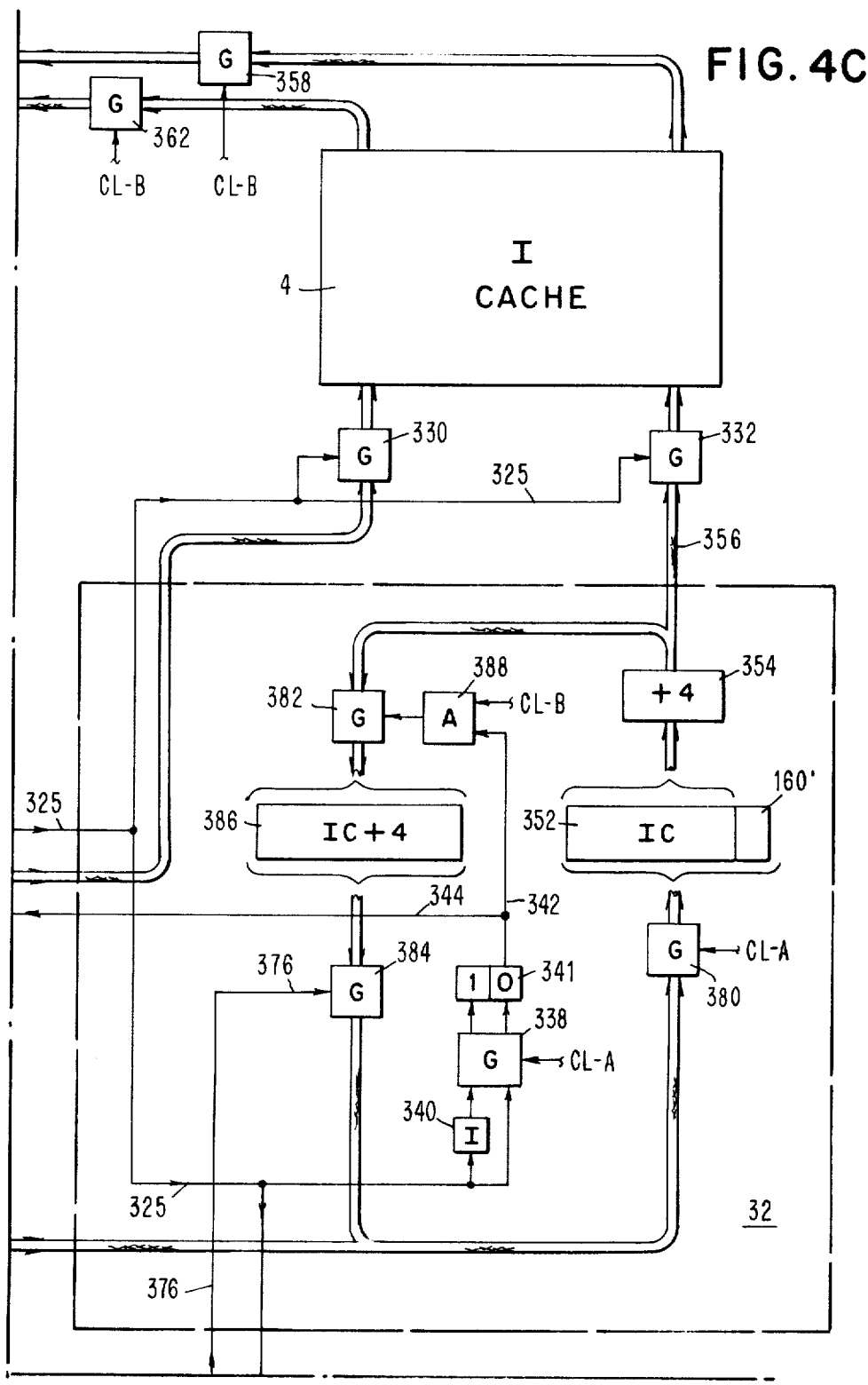

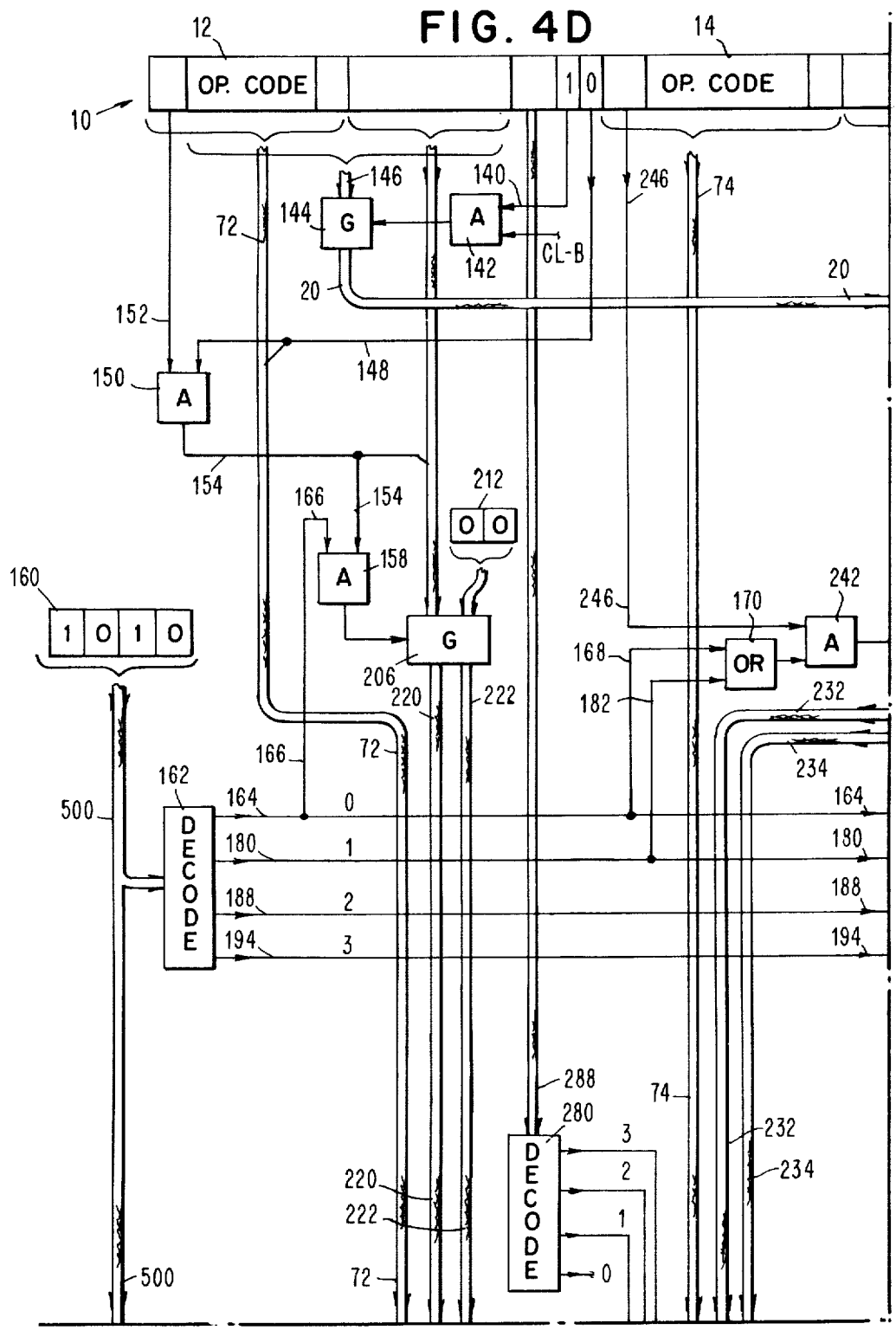

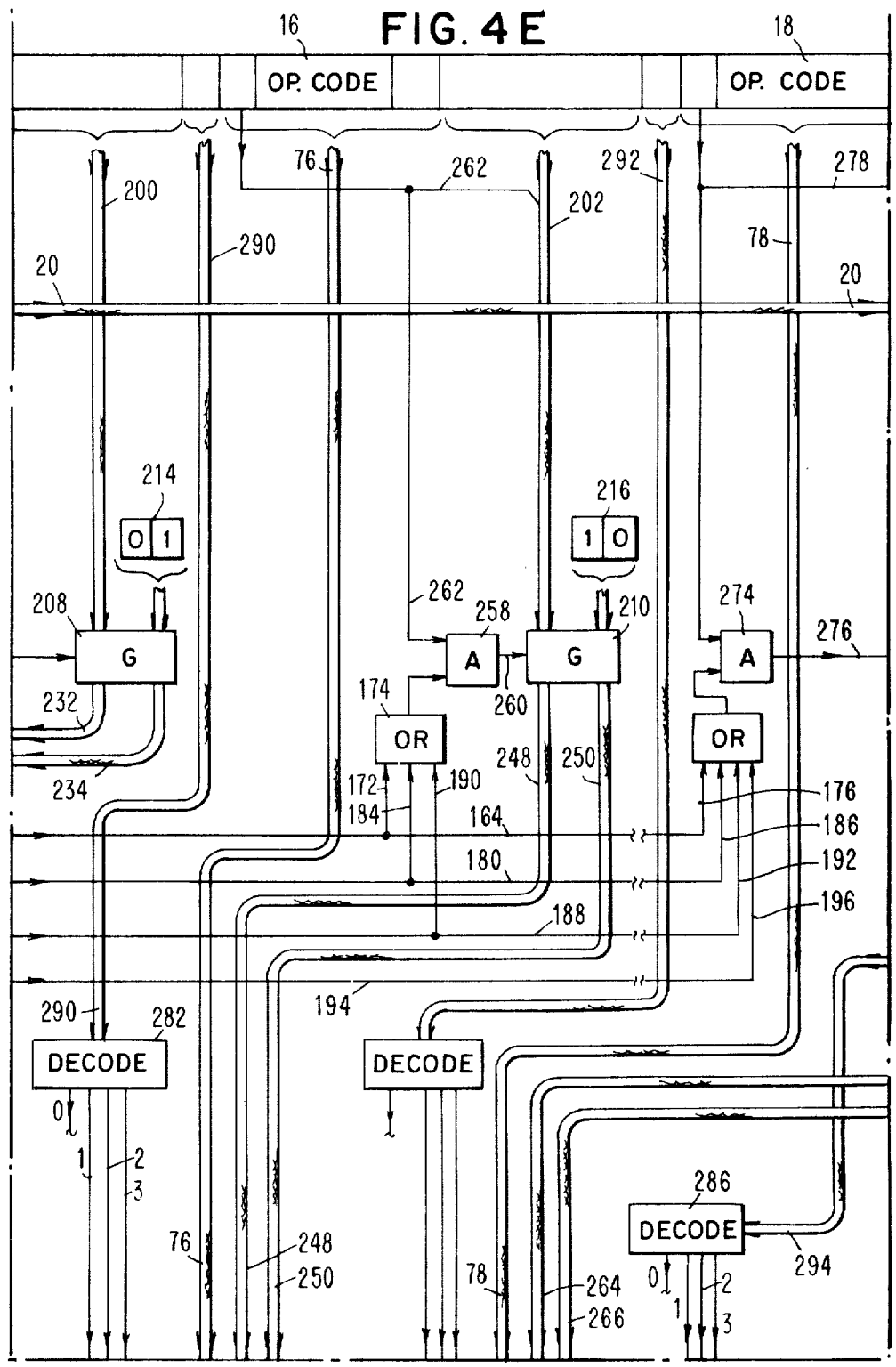

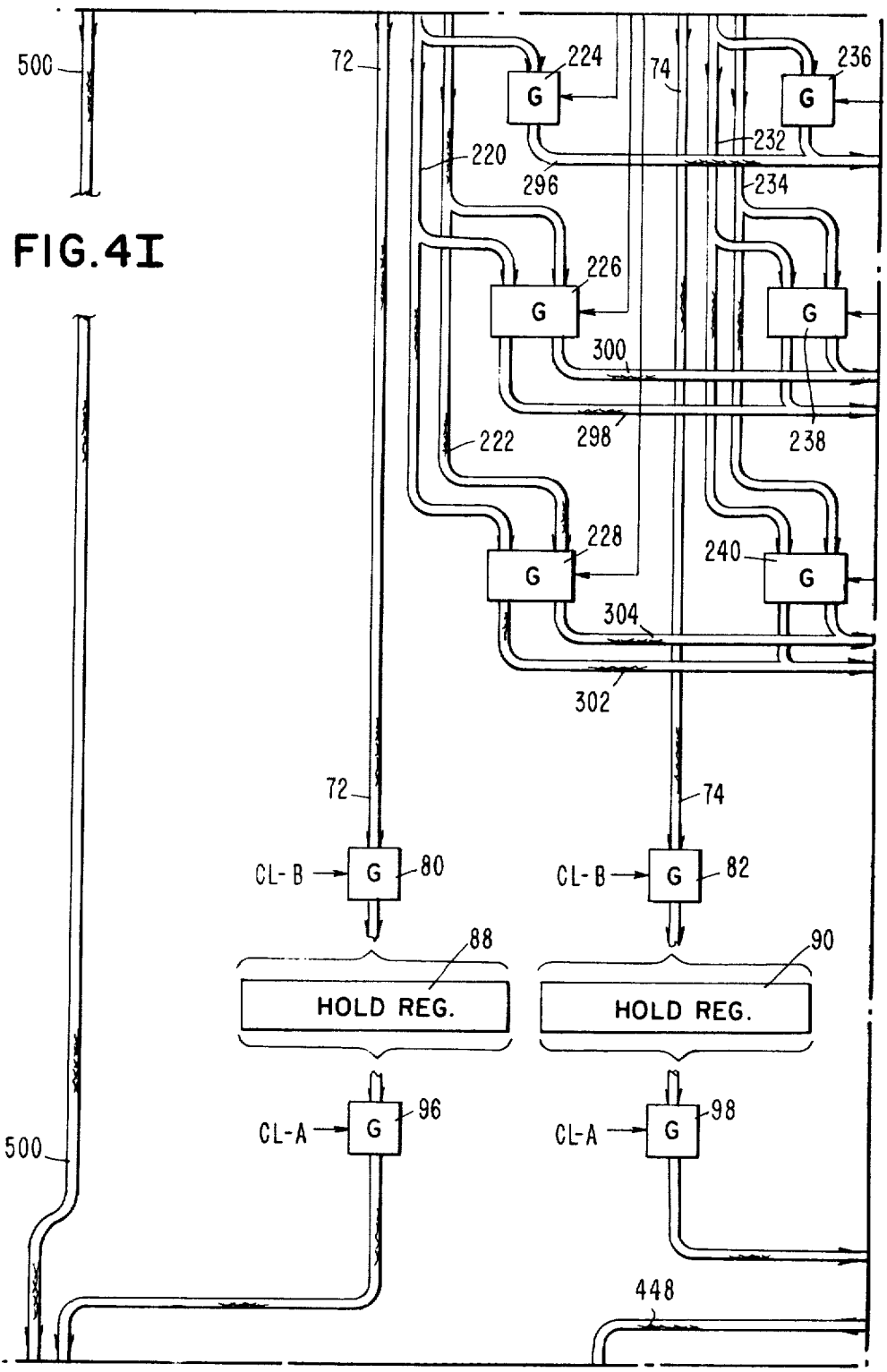

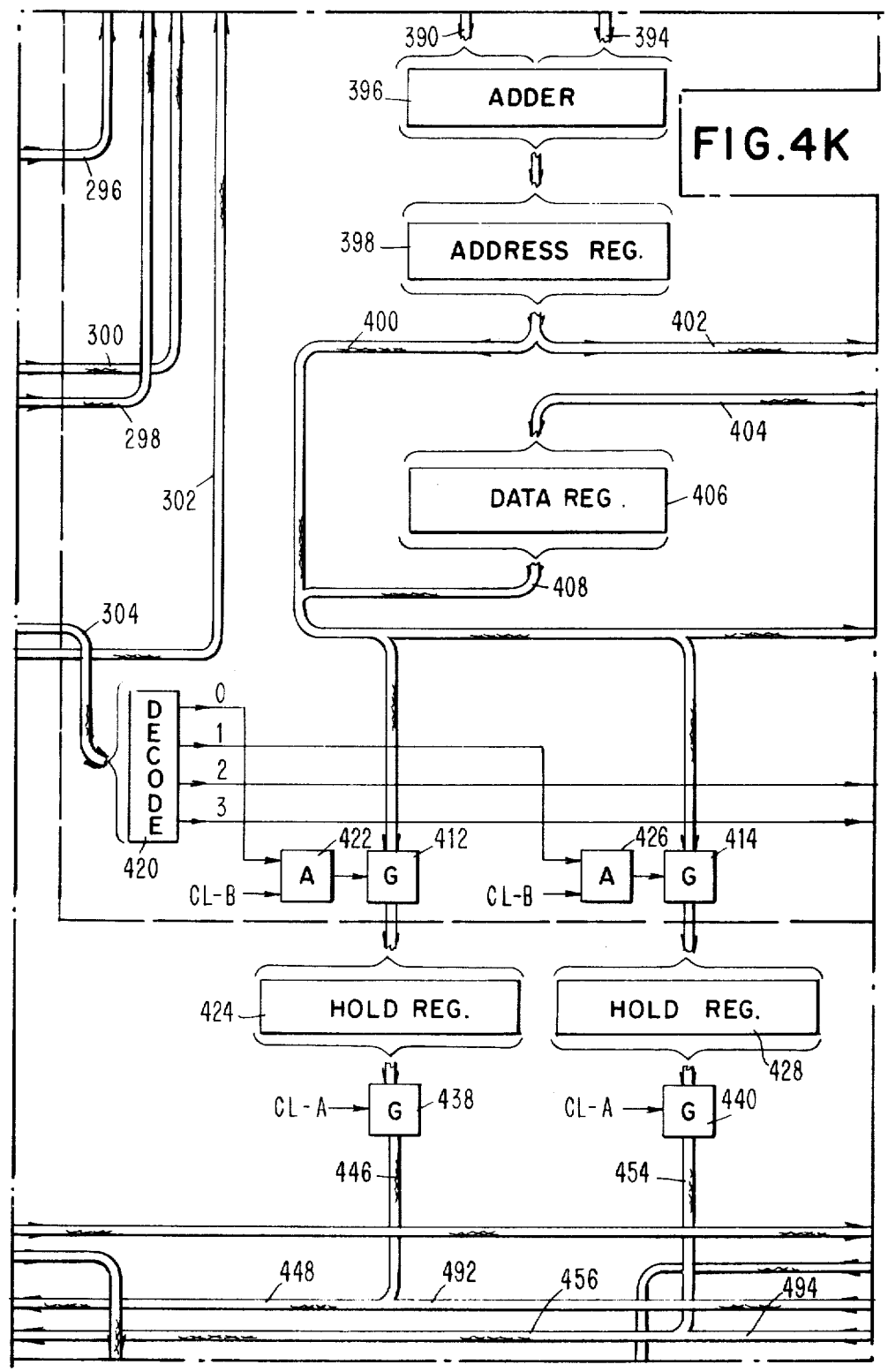

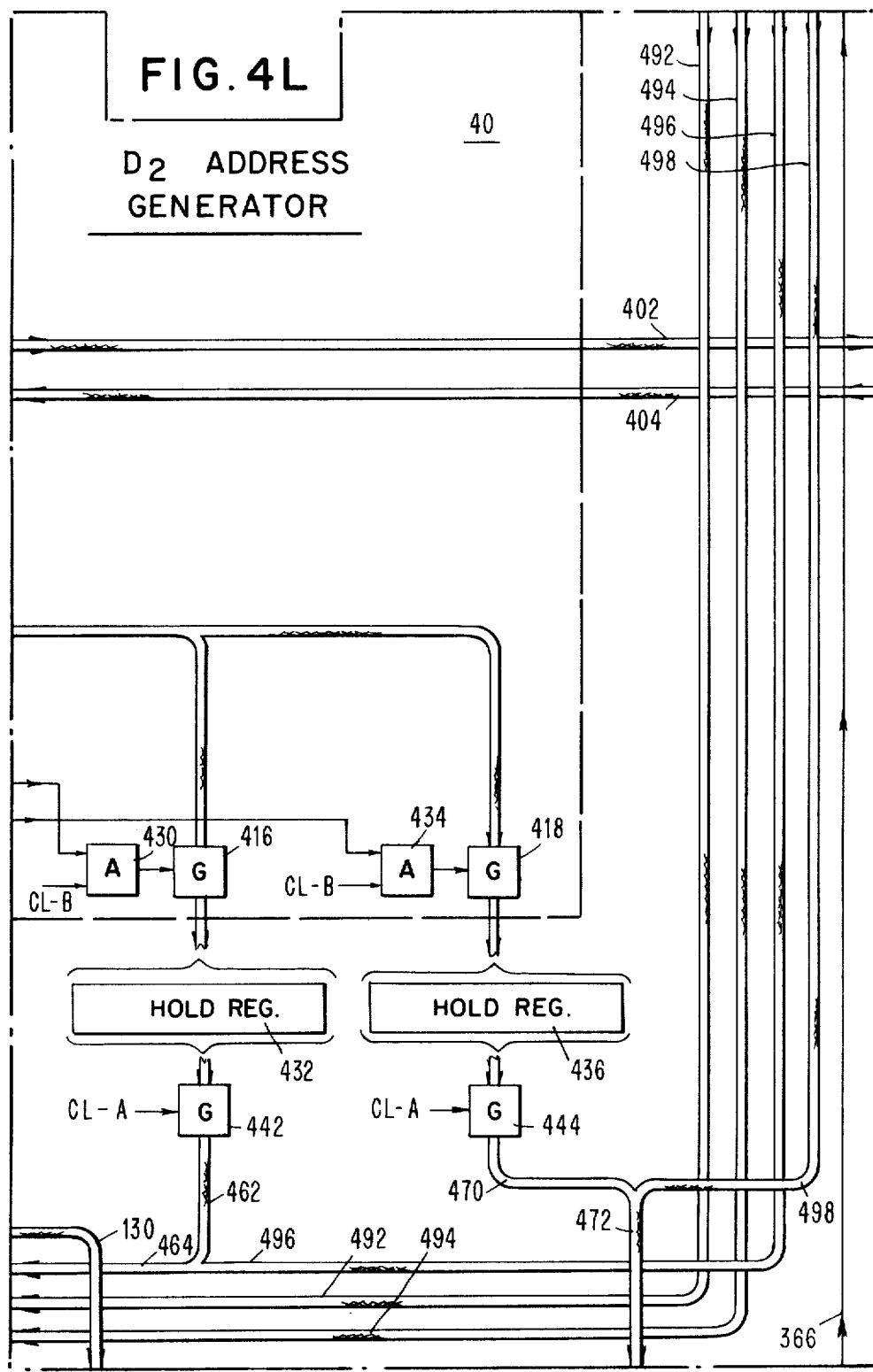

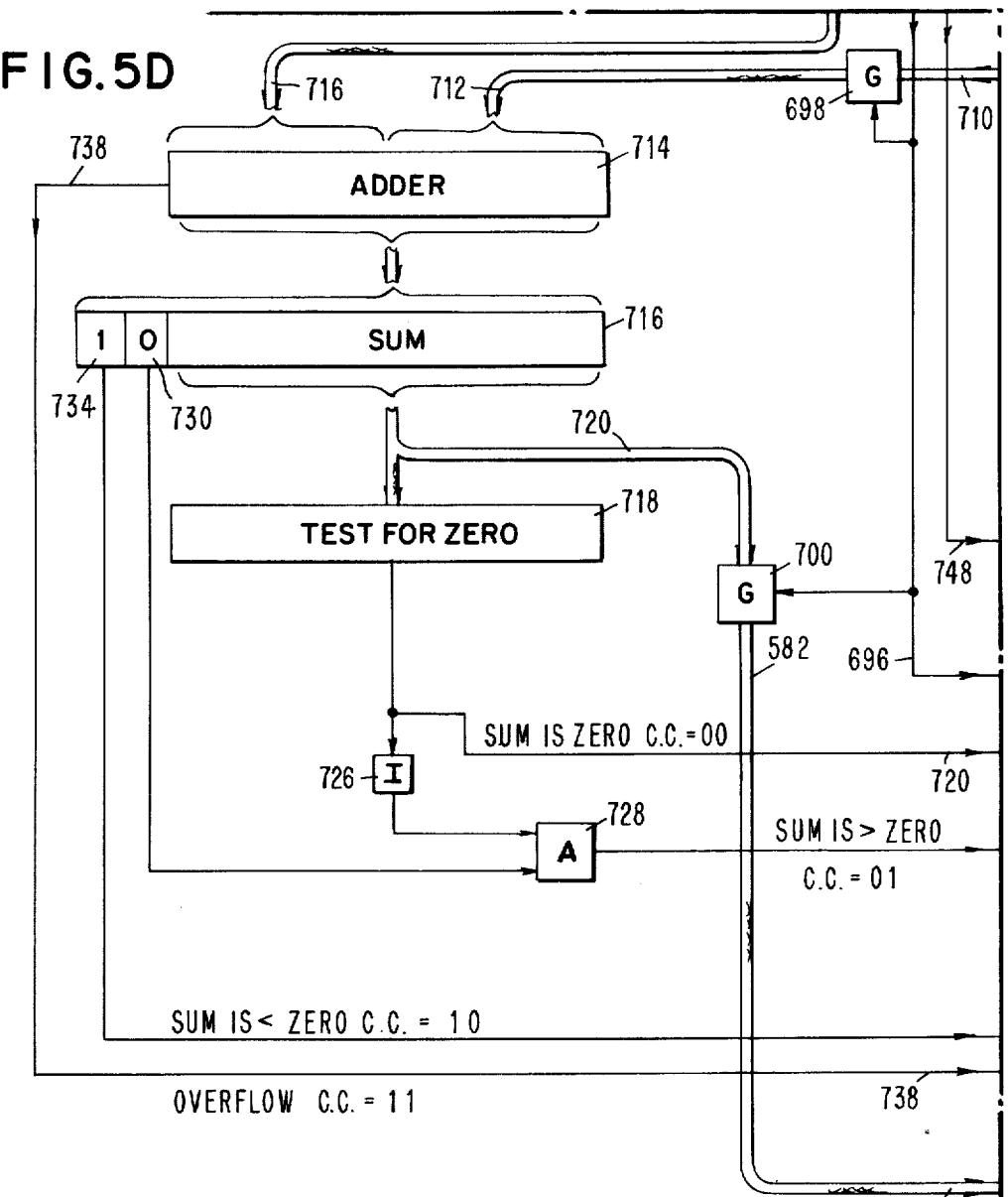

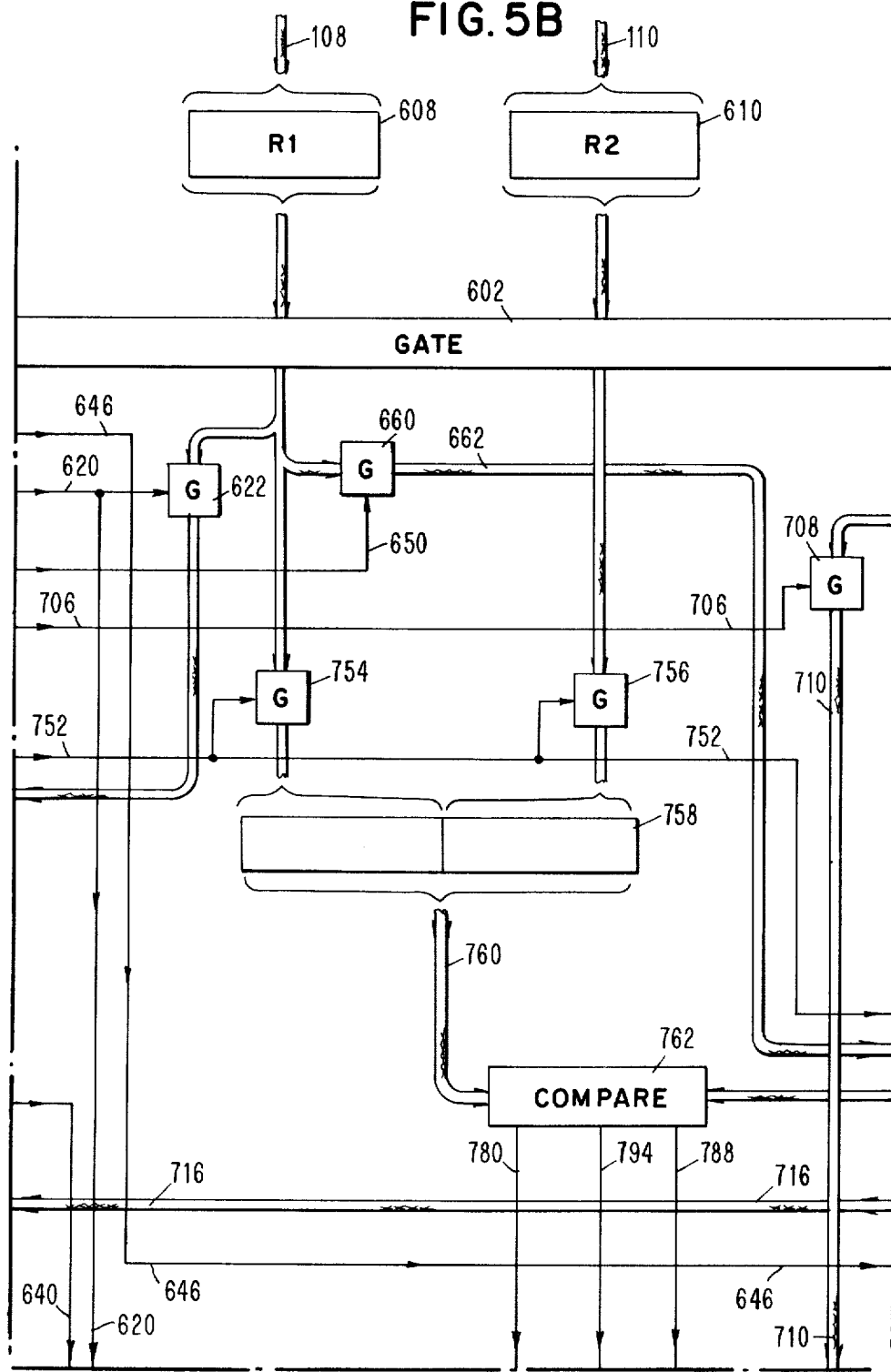

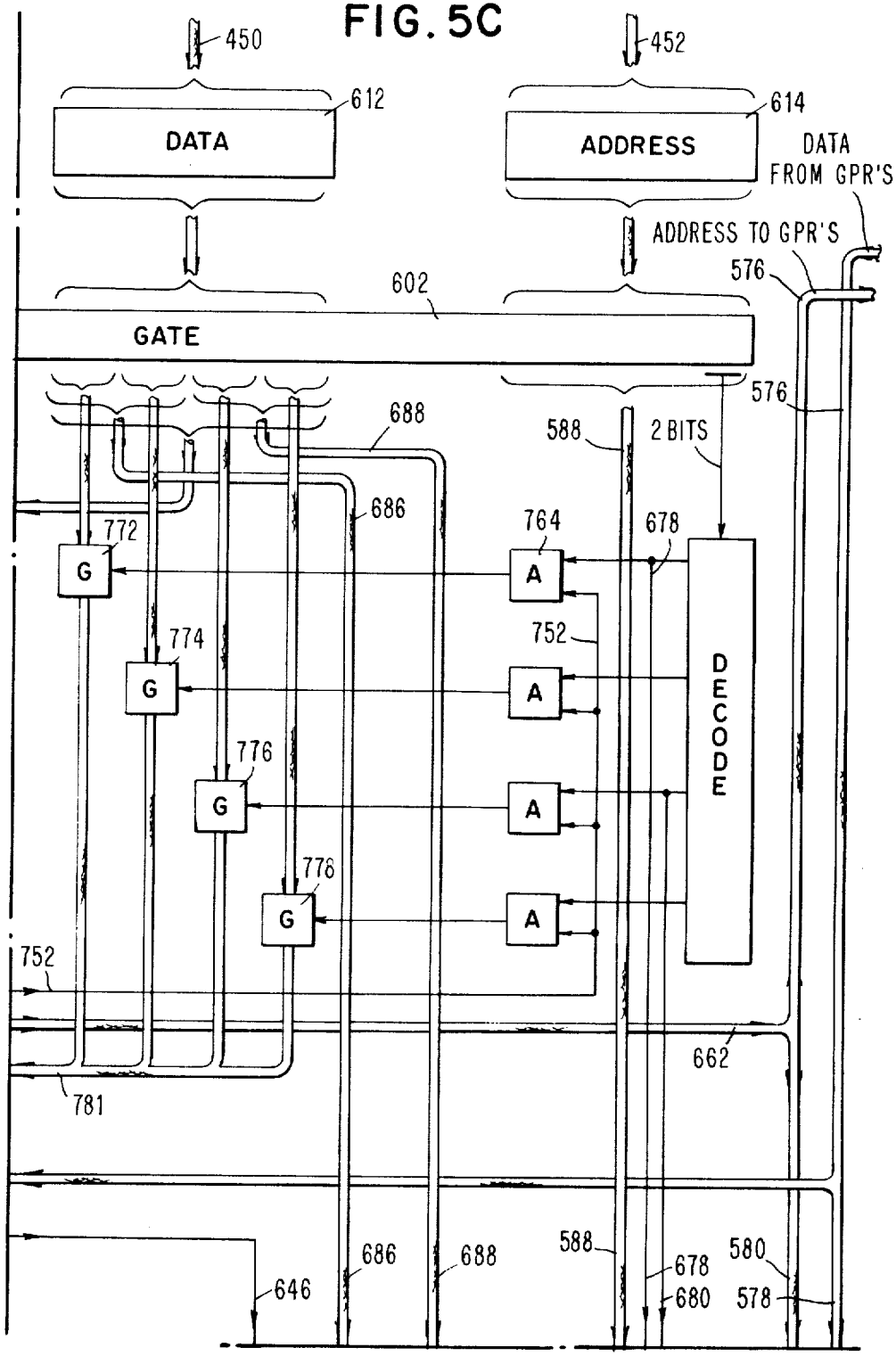

TAKE THE BRANCH

THIS LINE IS ACTIVE WHEN INSTRUCTION CALLS FOR SETTING THE C.C.

FIG. 6A

| CYCLE 1 | CYCLE 2 |
|---|---|
| MULTI INSTRUCTION WORD A IS IN REG. 10 (FIGS. 4D-4F) VIA GATES 326 AND 364 (FIG. 4A). GENERATE ADDRESSES AND FETCH FOR MULTI INSTRUCTION WORD A. | MULTI-INSTRUCTION WORD B IS PUT IN REG. 10 (FIGS 4D-4F). GENERATE ADDRESSES AND FETCH FOR MULTI INSTRUCTION WORD B. |
| INSTRUCTIONS TRANSFERRED TO HOLD REGISTERS 88, 90, 92 AND 94 FOR EXECUTION ON FOLLOWING CYCLE. | VALID BRANCH SIGNAL IS EFFECTIVE HERE. |
| | INSTRUCTIONS FOR MULTI INSTRUCTION WORD A ARE PUT INTO EXECUTION BOXES (FIGS. 4Q-4R) AND EXECUTED. |
| | INSTRUCTIONS FOR MULTI INSTRUCTION WORD B ARE TRANSFERRED TO HOLD REGISTERS 88, 90, 92 AND 94 FOR EXECUTIONS ON FOLLOWING CYCLE. |

| CYCLE 3 | CYCLE 4 |
|---|---|
| IDLE I PHASE | MULTI INSTRUCTION WORD C IS PUT IN REGISTER 10 VIA GATE 326 OR 364. |
| ALL GATES 326, 390 AND 377 (FIGS. 4A & 4B) ARE SHUT | |
| | LATCH "DATA WORD" FOR STORE TYPE OPERATION |
| INSTRUCTIONS FOR MULTI INSTRUCTION WORD B ARE EXECUTED | |
| | INSTRUCTIONS TRANSFERED TO HOLD REGISTER FOR EXECUTION ON FOLLOWING CYCLE. |
| IF A CONDITIONAL BRANCH OR UNCONDITIONAL BRANCH IS TAKEN, SELECT GATE 377 (FIG. 4B). | |
| IF THE BRANCH IS NOT TAKEN, SELECT GATE 390 (FIG. 4A) | |

MACHINE FOR MULTIPLE INSTRUCTION EXECUTION

DESCRIPTION

1. Technical Field

The invention is in the field of computing machines, and in particular is directed to instruction execution sequences. Specifically, the computing machine according to the present invention is directed to the concurrent execution of multiple instructions of a given type during a single machine cycle with each instruction utilizing a different set of data.

Most high speed computing machines execute programs of a scientific nature faster than programs of a commercial type. The difference in speed is in large part due to the composition of the instruction sequences typically found in the two kinds of codes. Scientific instruction streams have a regular and recurring pattern of instructions which tend to be well handled by a pipelined machine organization. On the other hand, commercial instruction streams are characterized by bit and byte manipulations broken into irregular sequences by very frequent branch instructions. Although some pipeline organizations had been refined to handle this latter kind of code suprisingly well, it appears that pipelining is not the best organizational approach.

The main architecture of computers has adhered to the idea of instructions being performed one-by-one, in program sequence, with each instruction being fully completed before the next instruction is begun.

Pipeline designs, in order to process an instruction stream as fast as possible, actually start work on the next instruction before the previous one(s) are completed, however, control logic is also provided to insure that the end result is as if all previous instructions are complete. The design approach, following the architecture approach is to treat each instruction as a unit of work to be performed in its turn. Each type of instruction, according to its nature and probable frequency of occurrence, may be given differing amounts of design and hardware treatment, but the instruction sequencer deals with them one-by-one, decoding each for a cycle and then sending it on its way through an appropriate path. Branch instructions, in this sense, are treated like all other instructions. In order to keep the pipeline moving a choice is made whether to take the branch or not, and subsequent instructions along the chosen path are handled conditionally until the outcome is resolved. If the right choice is made the pipeline motion is uninterrupted, if the wrong choice is made the conditional work is discarded and some time is lost.

When branches are very frequent, as set forth above, the pipeline approach becomes troublesome. Consider a sequence of instructions:

MVI, SLR, ST, CLI, BC, CLI, BC, CLI, BC, CLI, BC;

where BC is indicative of a branch instruction.

In the eleven instructions above there are four conditional branches (BC). If there are wrong guesses on three of the branches, the computer begins conditional instructions which are later discarded, resulting in seven wasted cycles of computing time.

2. Background Art

There are several known approaches for trying to enhance the instructions per cycle in a computing machine.

U.S. Pat. No. 4,025,771 to Lynch, Jr. et al discloses a pipeline high speed signal processor, in which multiple paths or pipelines are provided, one or more for processing the data, and one for processing instructions which control the data processing. These pipelines allow greatly increased instruction execution rates and therefore greatly increase data processing rates because execution of more than one instruction requiring more than one clock cycle may be in progress. This is accomplished by providing a chain of registers in the control pipeline through which all instructions are stepped, one following the other, every other clock pulse. An instruction decoder is connected to each register such that, at each stage or phase of the instruction pipeline provided by the chain registers, the necessary control signals for the overlapping execution of instructions are provided at different stages of a data processing path in an arithmetic unit.

U.S. Pat. No. 3,771,138 to Celtruda et al discloses apparatus and method for serializing instructions from two independent instruction streams. The apparatus includes a buffer for instructions of each of the independent instruction streams. These buffers are connected to a selection means which sample various resources and determines which instructions of the two independent instruction streams are to be executed next.

U.S. Pat. No. 3,401,376 to Barnes et al discloses a computer module which possesses a true look-ahead feature in that although parallel processing of a present and anticipated command is being affected, no command is presently executed in a final station until it is ascertained that the future commands in a look-ahead station do not have branching or other occurrence which would render the processing or execution of the present commands detrimental or unnecessary.

The above cited art discloses in general, the provision of plural instruction per cycle, with the Barnes et al patent disclosing the feature of not permitting a branch execution until it can determine that execution is necessary. The art above, however, does not disclose the execution of groups of instruction during a given machine cycle.

SUMMARY OF THE INVENTION

According to the present invention, a quite different approach is taken to instruction execution and this in turn leads to a new computing machine organization which is capable of running commercial workloads significantly faster than pipeline systems. In this approach, certain groups of instructions, rather than a single instruction, are considered as the units of work. In the eleven instruction sequences given above, for example, the units of work would be arranged in the following four groups:

1. MVI, SLR, ST, CLI, BC
2. CLI, BC
3. CLI, BC
4. CLI, BC

That is, the unit of work is taken to be the sequence of instructions starting just after a branch (BC) and continuing through and including the next branch (BC). The argument for this unit of work is that correct program execution requires that if the first instruction in such a group is executed, then all instructions of the group must also be executed. For example, in group (1) above, if the MVI is executed then SLR, ST, CLI and BC must also be executed. The final (branch) BC of course, allows a choice between two groups for the next unit of work, depending on the outcome of the test instruction (CLI).

Choosing this unit of work allows the system designer to consider the net effect of all instructions in the group and to produce, hopefully within one cycle, the correct system-state for whichever unit of work is next. Stated another way, each unit of work should be made available in entirety so that the system designer can have the ability to complete the unit of work in as short as possible time. Conceptually the notion is to accomplish the unit of work in one machine cycle at the end of which the final branch instruction outcome is also determined. The next unit of work, as chosen by the foregoing branch, is to be ready for execution on the next cycle, and so forth.

In more symbolic terms, the conventional approach is to handle a string of instructions $(I_1, I_2, I_3 \ldots I_n)$, in sequence whereas the proposed approach according to the present invention is to handle groups of instructions $G(I, I_k)$ in sequence $G_1, G_2, G_3, \ldots G_m$; where $I_k$ is always a branch instruction and the only one in the group.

BRIEF DESCRIPTION OF THE DRAWINGS

FIGS. 1A and 1B are a block diagram representation of the multiple instruction execution machine according to the present invention;

FIG. 3 is a representation of three "multi-instruction words", indicating how the instruction counter is incremented by a count of +4 from one "multi-instruction word" to the next;

FIG. 5 is a layout showing the arrangement of the sheets of drawings which make up FIGS. 5A thru 5F;

FIGS. 5A thru 5F are block diagram representations of the execution logic networks which are illustrated generally in FIGS. 4O thru 4R;

FIGS. 6A thru 6C comprise a timing chart for three "multi-instruction words" as used in the present invention.

DISCLOSURE OF THE INVENTION

Figure 1A:
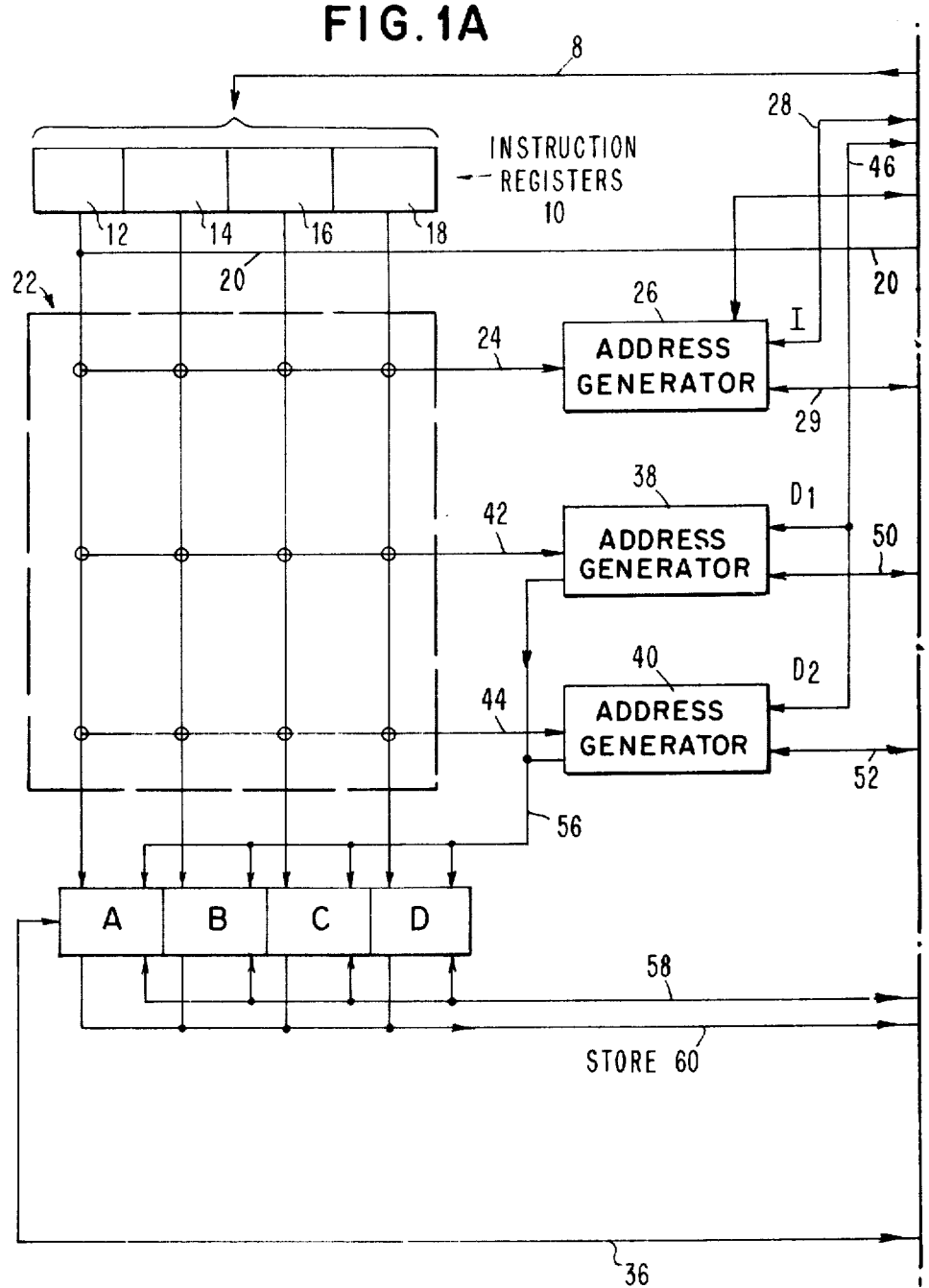

A computing machine which utilizes instructions that have been compiled into groups. A group consists of from one to n instructions, where n is an integer determined by the particular implementation of the machine. The integer four is utilized for purposes of the following description, however, it is to be understood that the group length can be less than four or greater than four. For a group of four, the group of instructions must conform to the following rules:

1. The group shall consist of no more than four instructions.

2. The group must not demand more than two fetches. Accordingly, this rule may limit the group to less than four instructions.

3. Not more than one store operation is permitted in a group. Since a store operation requires a fetch, one of the fetches in rule 2 may be because of a store operation.

4. If a branch instruction occurs, the branch instruction must always be at the end of a group. Thus, a group may consist of three instructions followed by a branch, two instructions followed by a branch, one instruction followed by a branch or the branch instruction alone.

At the same time the compiler compiles the instructions into groups, it sorts each group in a separate memory word. Thus, if a memory word is completely filled up, it contains four instructions. However, the memory word can contain a group of three instructions followed by one blank instruction space, a group of two instructions followed by two blank instruction spaces or a group of one instruction followed by three blank instruction spaces.

This grouping of instructions, which is performed by the compiler, is called a "multi-instruction word". This "multi-instruction word" has space for four instructions and they actually contain from one to four valid instructions. There is a "validity" bit associated with each instruction space in the "multi-instruction word". If this bit is set to ONE it indicates that the instruction is to be executed. If this bit is set to ZERO, it indicates that the instruction space is a blank and should be disregarded.

The main purpose of the "multi-instruction word" is that there are many instructions which are called "type one" instructions. These types of instructions are instructions that can be executed in one machine cycle, and generally involve changes in the program status word, changes in the general purpose registers or a store operation, and many of these instructions can be executed in parallel.

According to the present invention, method and apparatus is disclosed in providing execution of the "type one" instructions in parallel, thus increasing the speed of operation of a computing machine.

BEST MODE OF CARRYING OUT THE INVENTION

The multiple instruction machine according to the present invention may be a single machine including all components, or may be comprised of an existing computer with a new machine sharing component as set forth below, for ease of description. A multiple instruction execution system is set forth generally in FIG. 1. A principal computer 2, which, for example, may be an IBM 370, includes an instruction cache 4 and a data cache 6, as well as other standard computer components, not shown.

The compiler (not shown), and as previously set forth, compiles the instructions into groups of n, where n is an integer, instructions in the instruction cache 4, with the instructions being provided via a line 8 to a decode and address generation register 10, which include four register stages, 12, 14, 16, and 18 for receiving the four instructions which comprise a group. A non "type one" instruction, if present, is always positioned in the left most register stage, that is, register stage 12. Assuming that a non "type one" instruction is stored in the register stage 12, this instruction is immediately transferred via a line 20 to the instruction Q of the computer 2 for the instruction to be executed therein in the normal manner.

The "type one" instructions stored in the register 10 are transmitted to instruction Execution Logic Boxes A, B, C and D, in parallel by way of a switching and logic unit 22, with the instruction in register stage 12 being applied to Execution Logic Box A, the instruction in register stage 14 being applied to Execution Logic Box B, the instruction in register stage 16 being applied to Execution Logic Box C, and the instruction in register stage 18 being applied to Execution Logic Box D.

In the event there is an instruction fetch, the request is applied from register 10 to the switching and logic unit 22, and via a line 24 to an instruction address generator 26. The instruction address generator 26 requests an instruction fetch from the instruction cache 4 via a line 28. The fetched instruction is then applied via line 8 to the decode and address generation register 10 for application to an appropriate Execution Logic Box during the next cycle of operation. Data is requested and returned from general purpose registers 48 via line 29.

The instruction address generator 26 also exchanges information via a line 30 with a program status word unit 32, which includes the instruction counter for providing instruction requests to the instruction cache 4 via a line 34. The program status word unit 32, also exchanges a condition code with Execution Logic Boxes A, B, C and D via a line 36.

In the event there is a data fetch, data address generators 38 and 40 receive data fetch requests via lines 42 and 44, respectively, from the switching and logic unit 22. Data is then requested from the data cache 6 via a line 46. Data address and data return information is provided to the generators 38 and 40 from general purpose registers 48 via lines 50 and 52, respectively. The general purpose registers 48 also exchange address and data information with the principal computer 2 via a line 54. The data address generators 38 and 40 provide address and data information to the respective Execution Logic Boxes A, B, C, and D via a line 56, such that the appropriate "type one" instructions may be concurrently performed. The respective Execution Logic Boxes, exchange information via a line 58 with the general purpose registers 48 for a proper execution of the "type one" instructions. Whenever a store operation is performed by one of the Execution Logic Boxes, the data to be stored is provided therefrom via a line 60 to the data cache 6 in the principal computer 2. The detailed description of how the multiple instruction execution system functions will be described shortly with reference to FIG. 4.

Figure 2:
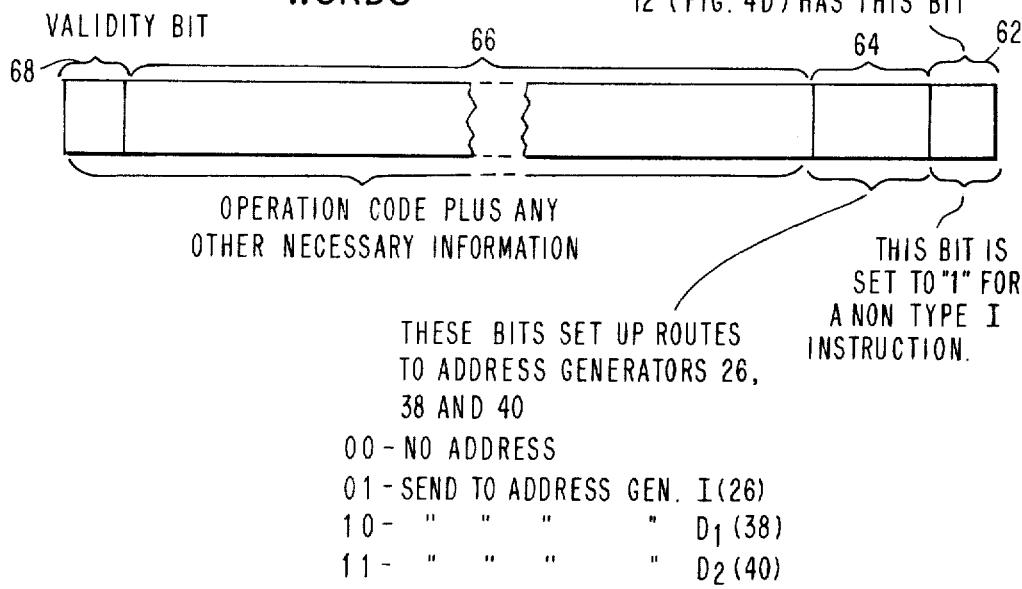
FIG. 2 is an instruction format for one instruction word which is part of a "multi-instruction word"

FIG. 2, illustrates the instruction format for one instruction word of the "multi-instruction word" which is comprised of four such instruction words. Accordingly, each of the four instruction words is formatted as illustrated in FIG. 2. The right most bit 62 is a ONE if there is a "non-type one" instruction, and a ZERO is a "type one" instruction. The next 2 bits to the left, as at 64, set up routes to the respective address generators for instruction or data fetches. These, as previously set forth, are the instruction address generator 26, the first data address generator 38 or the second data address generator 40. If there is to be no instruction or data fetch, and accordingly no address generation, the two bits are set to "00". If there is to be an instruction address generator 26 and the two bits are set to "01". If there is a data fetch and the route is to be to the first data address generator 38, the two bits are set to "10". If there is a data fetch and the route is to be to the second data address generator 40, the two bits are set to "11". The remainder of the bits 66 to the left includes the operation code plus any other necessary instruction information. The left most bit 68 is a validity bit, and is used to indicate, if a ONE that the instruction is valid, and if a ZERO invalid and just a blank space in the memory word. As previously set forth, the "multi-instruction word" has spaces for four instructions. These spaces may be filled with valid instructions or invalid instructions. It is clear, however, that there must be at least one valid instruction in each "multi-instruction word". How the switching logic 22 responds to each of the four instructions will be set forth in detail shortly.

Figure 1:
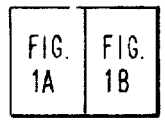
FIG. 1 is a layout showing the arrangement of the sheets of drawings which make up FIGS. 1A and 1B.

FIG. 3 illustrates a small memory in which the instruction addresses for the "multi-instruction words" are stored. A first memory word stores the instruction addresses "0000" to "0011". The second memory word stores the instruction addresses "0100" to "0111". The third memory word stores the instruction addresses "1000" to "1011". To address the first "multi-instruction word" in memory, only the left most two high order bits "00" are necessary, since these bits are the same for each of the four instructions comprising the first "multi-instruction word". In order to address the second "multi-instruction word" in memory, only the left most two high order bits "01" are necessary, since these bits are the same for each of the four instructions comprising the second "multi-instruction word". To address the third "multi-instruction word" in memory, only the left most high order bits "10" are necessary, since these bits are the same for all of the instructions in the third "multi-instruction word". Suppose that the instruction scheme has proceeded from the instruction address "0000" to the instruction address "1011" and the latter instruction is an unconditional branch, which branches the program back to instruction address "0101" as indicated by the arrow 70. This branch is accomplished by supplying only the high order bits "01" to the instruction cache 4 which provides the second "multi-instruction word" in the decode and address generation register 10 (FIG. 1). The low order bits "01" indicate at which of the four stages of the register the instruction sequence is to begin. This is described in more detail relative to the block diagram illustration of the system as set forth in FIG. 4.

Figure 4F:
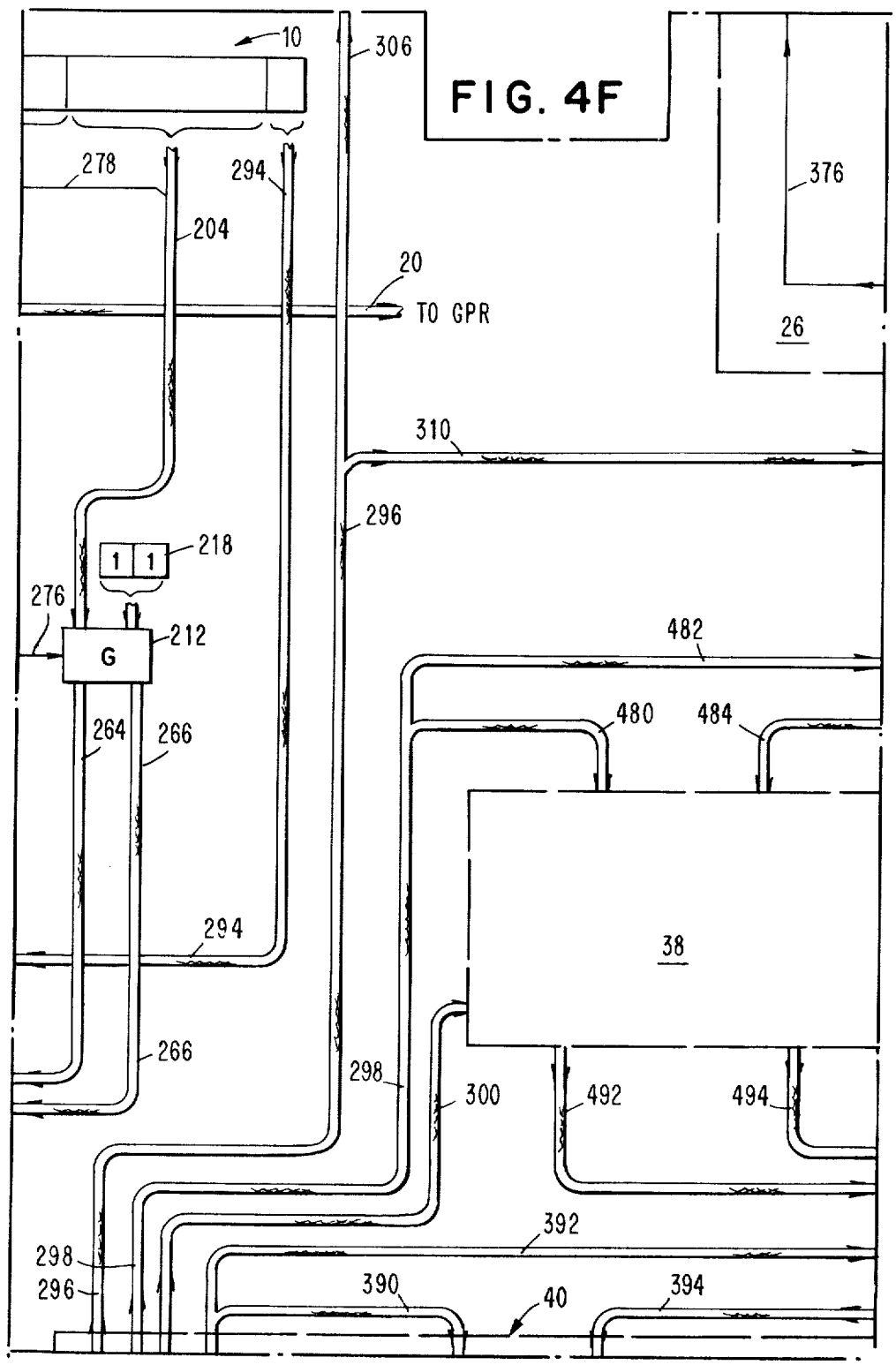
FIG. 4 is a layout showing the arrangement of the sheets of drawings which make up FIGS. 4A through 4S.
FIGS. 4A thru 4S are a more detailed block diagram representation of the multiple instruction execution machine which is illustrated generally in FIG. 1.
Figure 4G:
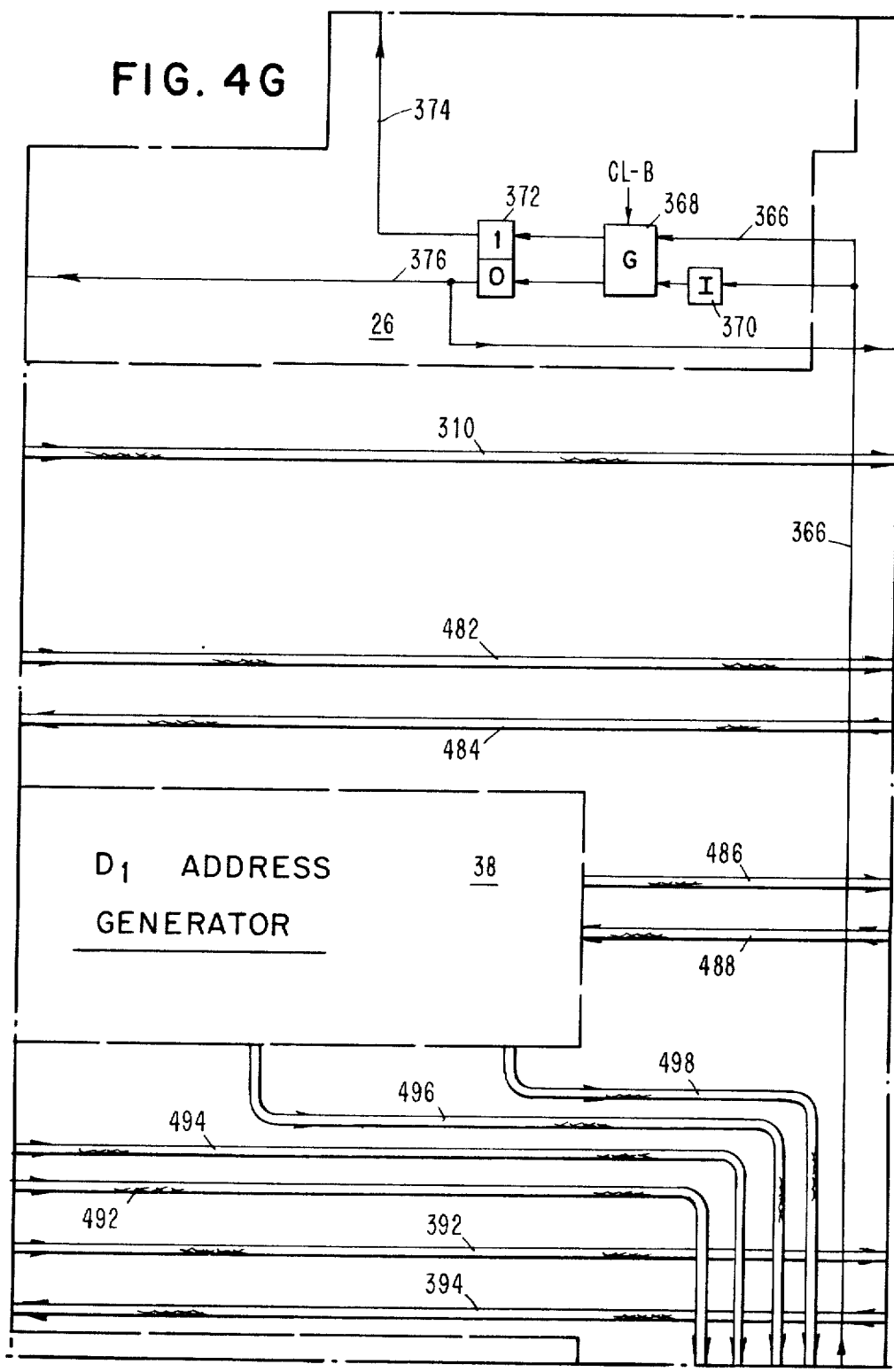
Figure 4H:
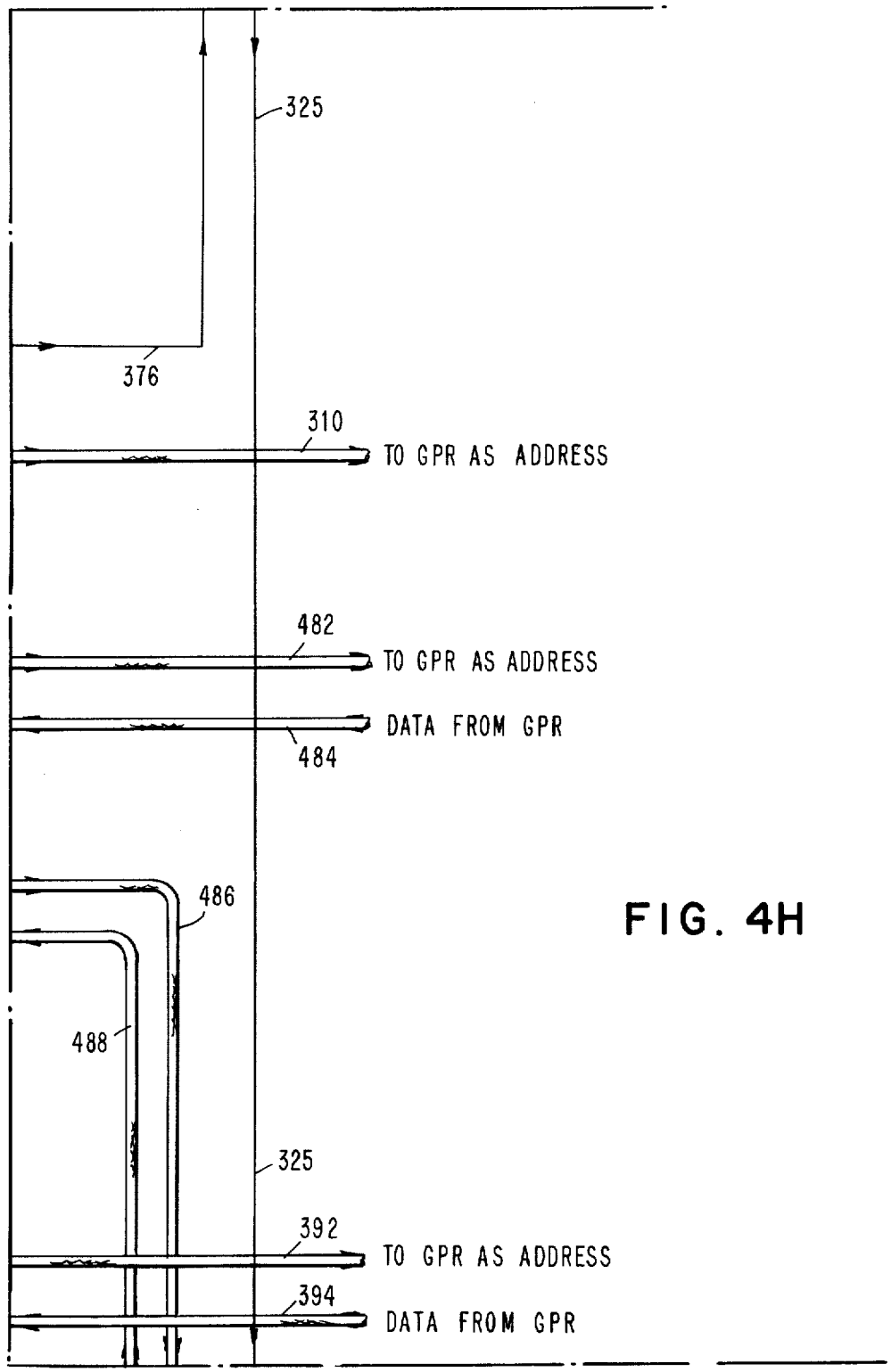
Figure 4J:
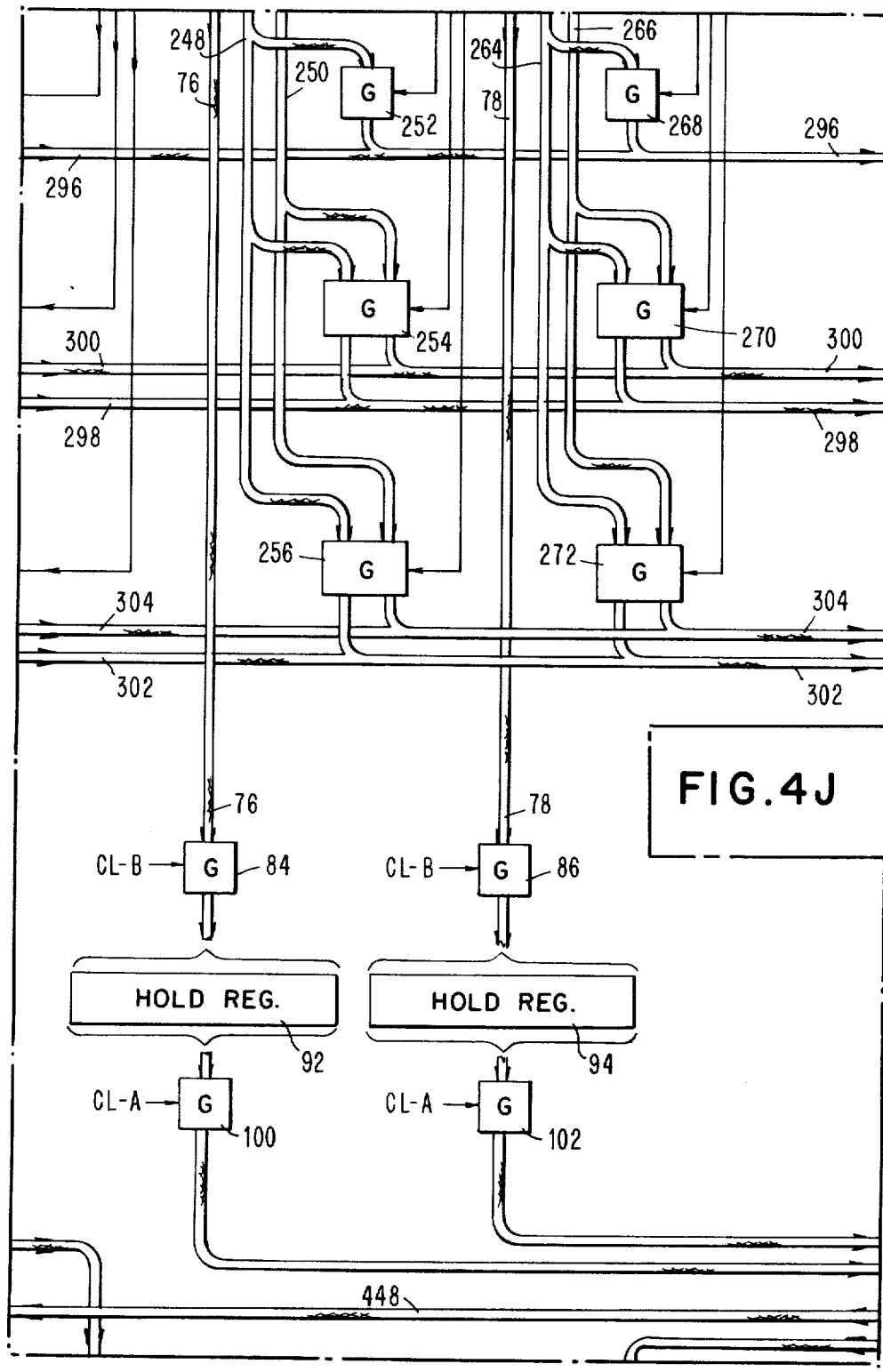
Figure 4M:
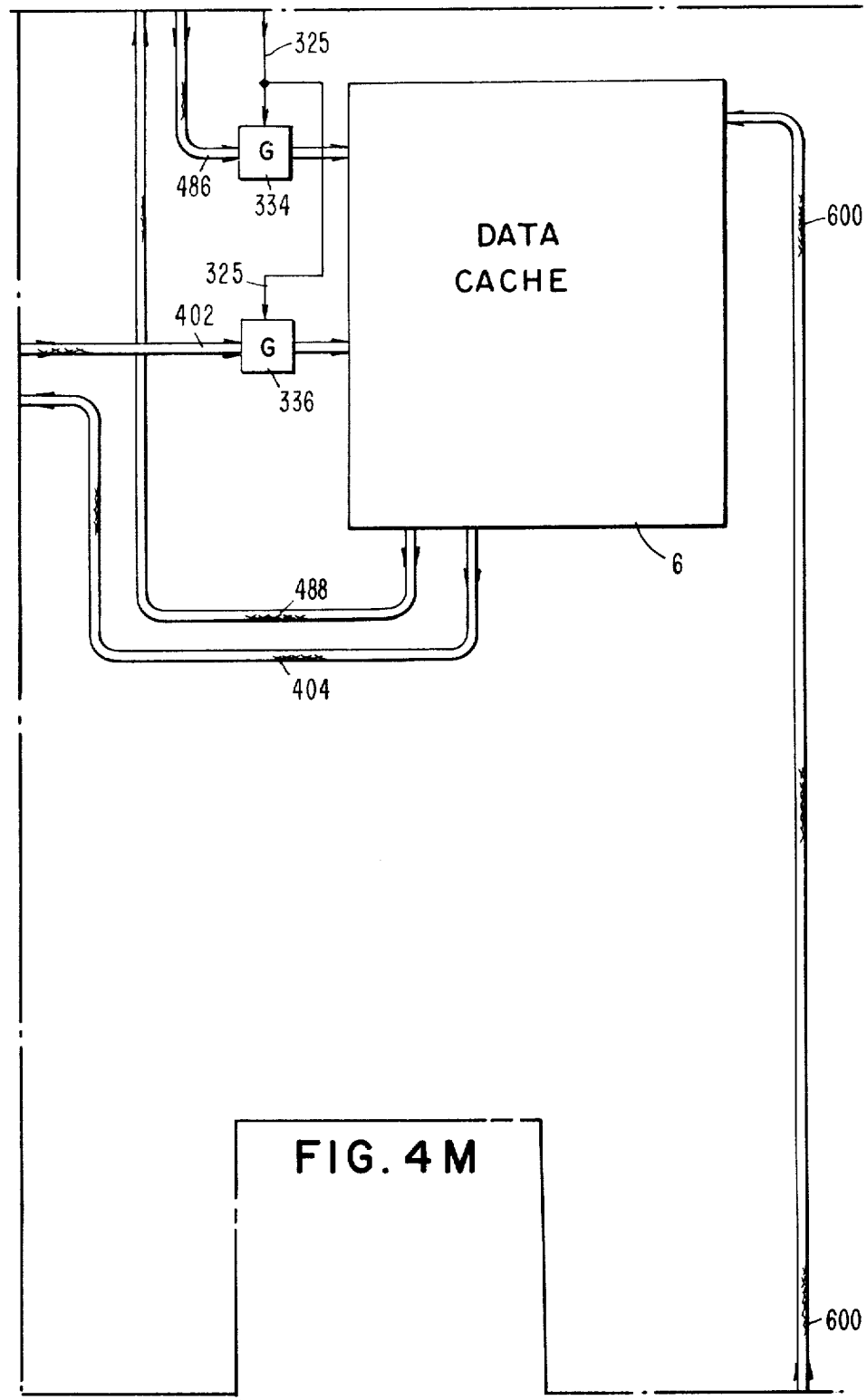
Figure 4N:
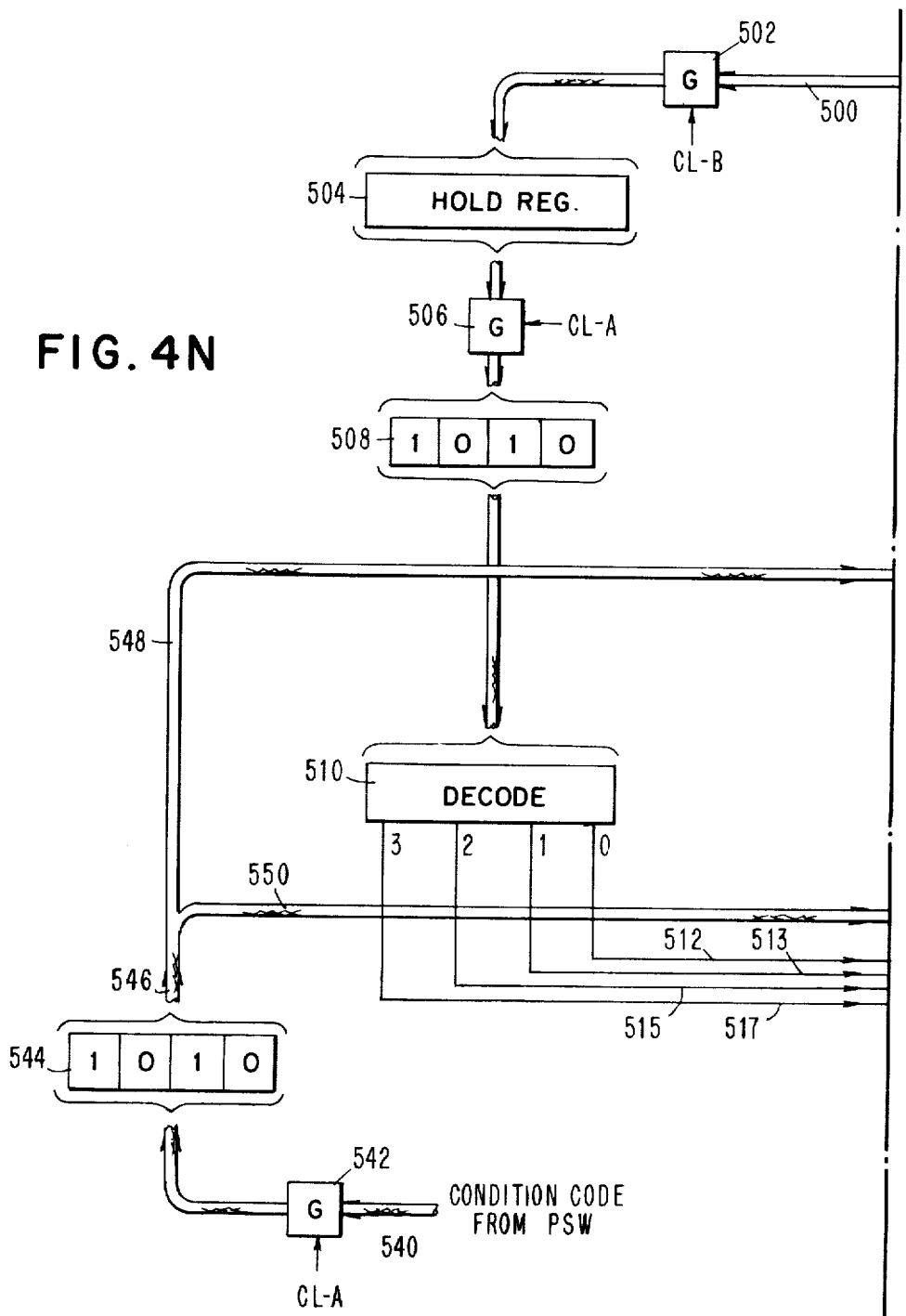
Figure 4:
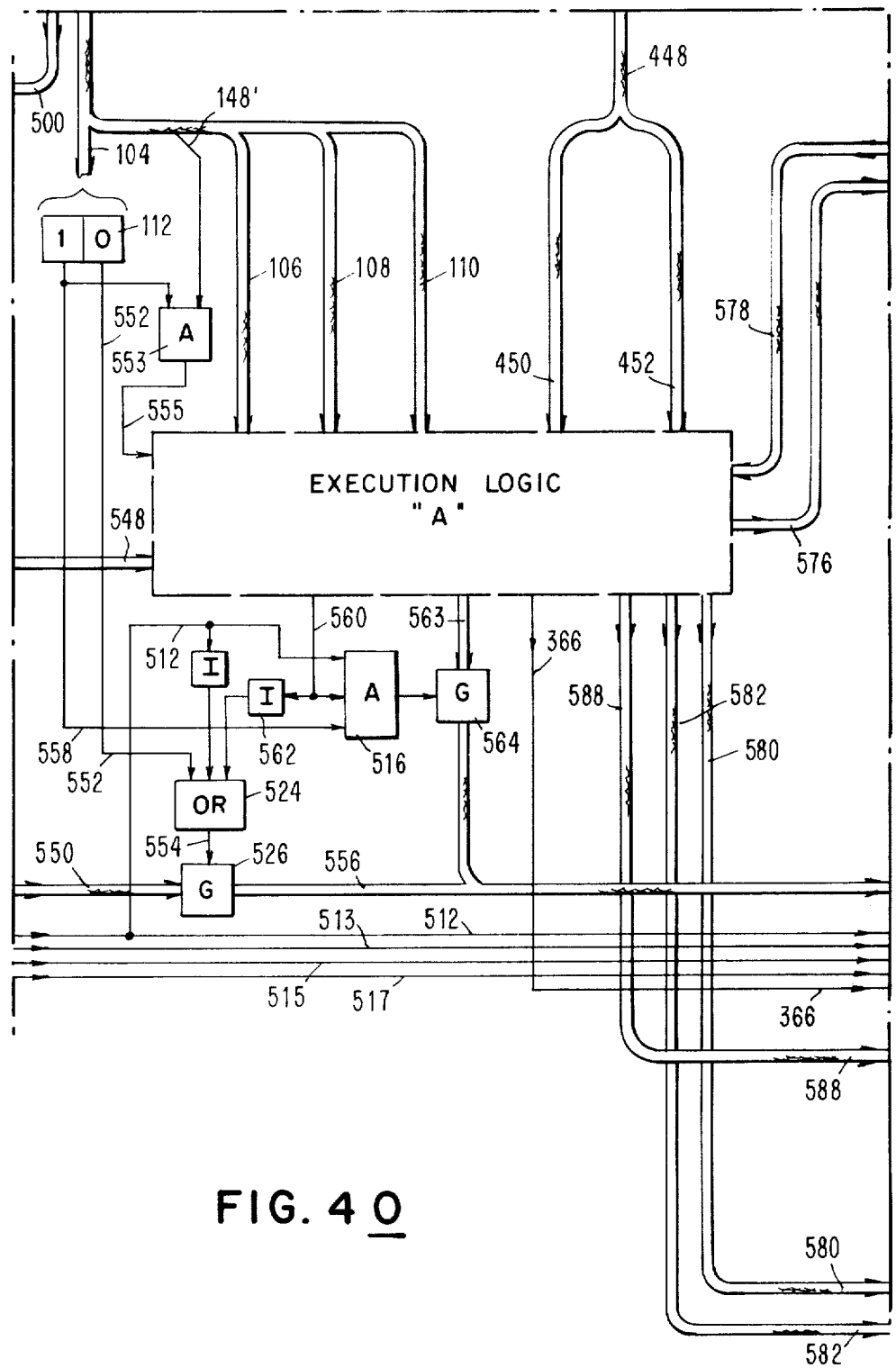
Figure 4P:
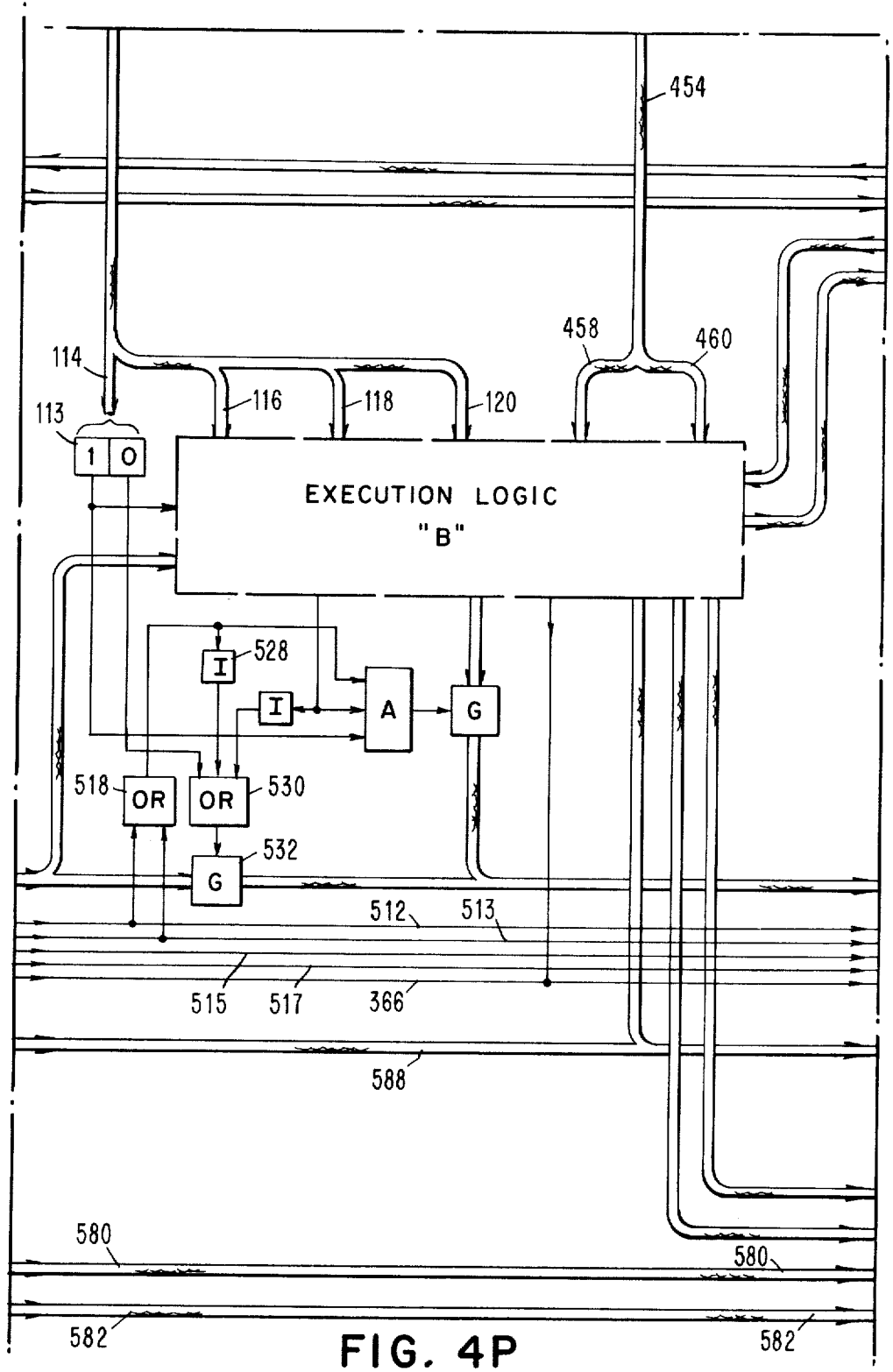
Figure 4Q:
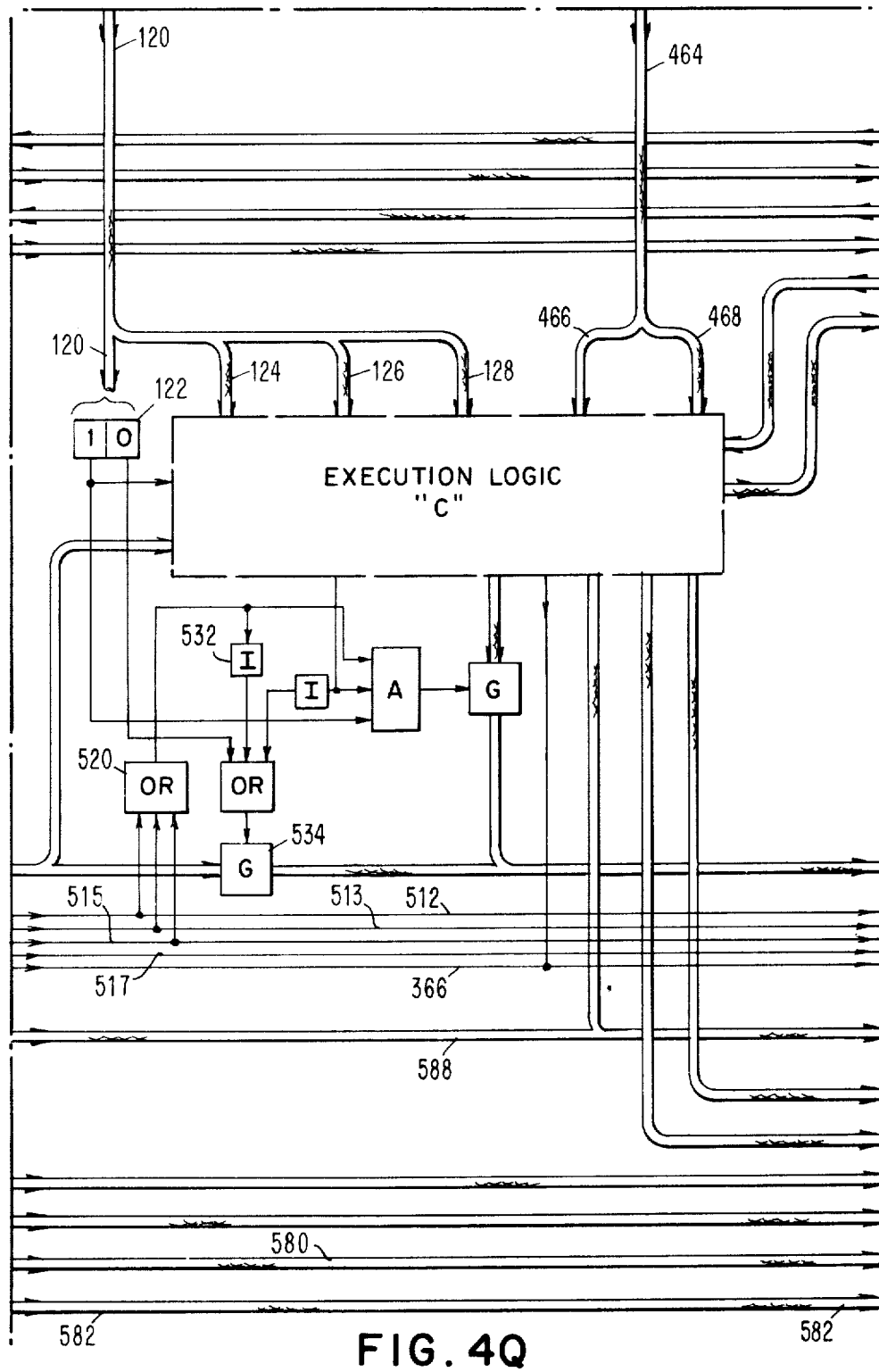
Figure 4R:
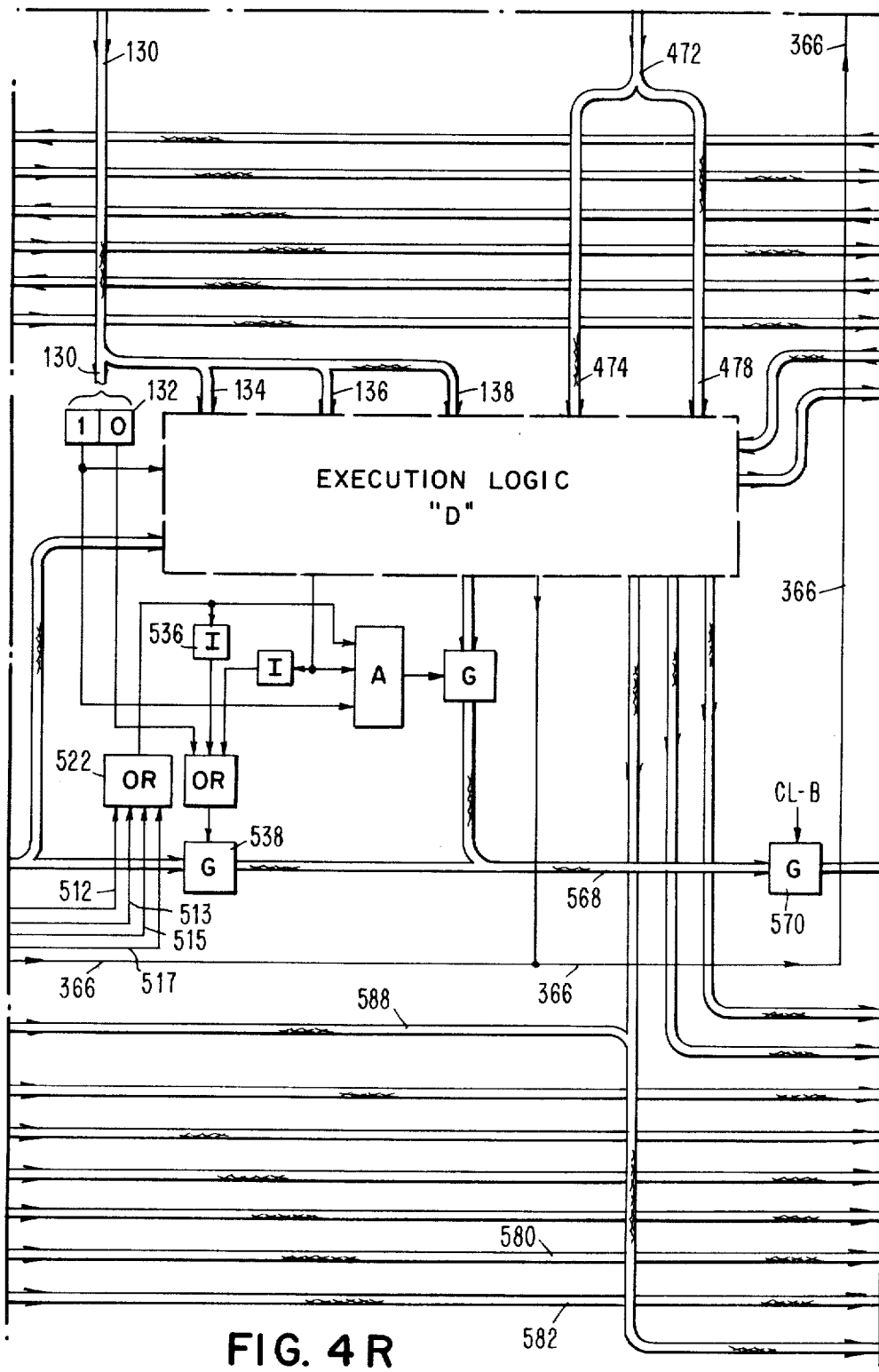

FIG. 4 sets forth in detail a block diagram of the multiple instruction execution system. The decode and address generation register 10 is loaded with the "multi-instruction word", comprised of four instructions, in the four stages 12, 14, 16 and 18. The OP code and R1 and R2 fields from the register stages, are provided via cables 72, 74, 76 and 78 to gates 80, 82, 84 and 86, respectively. In response to the provision of a clocking pulse CL-B, the gates provide the information from the respective instruction registers to holding registers 88, 90, 92 and 94. The outputs from these registers are provided to gates 96, 98, 100 and 102, and in response to the clocking pulses CL-A the contents of the respective registers are gated from these gates to the "Execution Logic Boxes" A, B, C and D. The contents of holding register 88 is gated through gate 96 with the validity bit, OP code, and the R1, and R2 fields being provided via cables 104, 106, 108 and 110 respectively, to a register 112 and to respective inputs of the Execution Logic Box A. The contents of the holding register 90 is gated through gate 98 with the validity bit, OP code, R1 field and R2 field being provided to register 113 and Execution Logic Box B via lines 114, 116, 118 and 120, respectively. The contents of holding register 92 is gated through gate 100, with the validity bit being provided on a line 120 to register 122, and with the OP code R1 field and R2 field being provided via lines 124, 126 and 128 to the Execution Logic Box C. The contents of holding register 94 is gated through gate 102, with the validity bit being provided via line 130 to register stage 132, and with the OP code and R1 and R2 fields being provided via lines 134, 136 and 138 to the Execution Logic Box D. How the Execution Logic Boxes respond to these inputs for concurrently execution the four instructions, are to be described in more detail shortly.

As previously set forth, if there are any "non-type one" instructions, these are entered in the left most register stage 12 (FIG. 4D). A binary ONE signal is provided on line 140 to a first input of a gate 142 for such a "non-type one" instruction. In response to the concurrent provision of clocking pulse CL-B to a second input of gate 142, the contents of the register 12 on input line 146 are passed by gate 144 to the output line 20 for provision to the principal computer for normal execution as previously set forth. On the other hand, if it is a "type one" instruction, the line 140 is inactive and accordingly the gates 142 and 144 are disabled. The line 148 is active, and this signal is provided to cable 72 and to a first input of a gate 150 which receives the validity bit on line 152 with the output of the gate 150 being provided on a line 154 to cable 156 and to a first input of a gate 158. As previously set forth, the two low order bits of the instruction counter provided to a register 160, with the output thereof being provided to a decoder 162. These two low order bits are used to indicate the starting position in the decode and address generation register 10. That is, does the sequence begin in stage 12, 14, 16 or 18. The decoder 162 provides a first output on a line 164 which is indicative of a ZERO count starting position with the line 164 being provided to a second input 166 of the gate 158, a first input 168 of a gate 170, a first input 172 of a gate 174 and a first input 176 of a gate 178. If line 164 is active, this is indicative that the sequence begins at stage 12 and includes stages 14, 16 and 18. A count indicative of one is provided on a line 180 to a second input 182 of the gate 170, a second input 184 of the gate 174 and a second input 186 of the gate 178. If line 180 is active, this is indicative that the sequence begins at stage 14 and includes stages 16 and 18. A count indicative of two is provided on line 188 to a third input 190 of the gate 174 and a third input 192 of the gate 178. If line 188 is active, this is indicative that the sequence begins at stage 16 and includes stage 18. A count indicative of three is provided on line 194 to input 196 of the gate 178. If line 194 is active, this is indicative that the sequence begins at stage 18 and includes no other stages.

The base and displacement is provided from the respective register stages 12, 14, 16 and 18 via cables 156, 200, 202, 204 to gates 206, 208, 210 and 212, respectively. These gates receive second inputs indicative of the respective stages of register 10 from registers 212, 214, 216 and 218, respectively. That is, the "00" from register 212 indicates that stage 12 is providing information; the "01" from register 216 indicates that stage 14 is providing information; the "10" from register 216 indicates that stage 16 is providing information; and the "11" from register 218 indicates that stage 18 is providing information. These indications, as will be explained in more detail shortly, are used by D1 and D2 address generators 38 and 40, respectively, to channel data fetches to the correct Execution Logic Box A, B, C or D. The gate 206 provides base and displacement on cable 220 to gates 224, 226, and 228, and register storage 12 indication on cable 222 to gates 226 and 228 in response to AND gate 158 providing an active output on line 230. Gate 208 provides base and displacement on cable 232 to gates 236, 238 and 240 and register stage 14 indication on cable 234 to gates 238 and 240 in response to AND gate 242 providing an active output on line 244 in response to the validity bit being active on line 246 and OR gate 170 providing an active output. Gate 210 provides base and displacement on cable 248 to gates 252, 254 and 256 and register stage 16 indication on cable 250 to gates 254 and 256 in response to AND gate 258 providing an active output on line 260 in response to the validity bit on line 262 and an active output from OR gate 174. Gate 212 provides base and displacement on cable 264 to gates 268, 270 and 272 and register stage 18 indication on cable 266 to gates 270 and 272 in response to AND gate 274 providing an active output on line 276 in response to the validity bit on line 278 and an active output from OR gate 178.

Decoders 280, 282, 284 and 286 are provided to decode the two bits designated at 64 (FIG. 2), to determine the address generator route to be taken for a given one of the instructions, if any, for fetching instructions or data. If the code is "0", there is no address route to be taken since this line of each decoder is not connected to a gate. On the other hand, if the address is "01" the 1 line from associated decoder is active and the gate associated therewith is enabled. For example, if the 1 line output of the decoders 280, 282, 284 or 286 is active, the respective gates 224, 236, 252 or 268 is enabled to provide base and displacement outputs on cable 296 for provision to the instruction address generator 26 to indicate that an instruction fetch is requested. How the instruction address generator 26 responds to this request is to be described shortly.

In response to the two bits being "10", the line 2 from the associated decoder is active and the gate associated therewith is enabled. For example, if the line 3 output from one of the decoders 280, 282, 284 or 286 is active, one of the gates 226, 238, 254 or 270 is enabled to provide base and displacement information on line 298 and register stage information for decoding purposes on line 300 to D1 address generator 38.

If the two bits are "11", the line 3 of one of the decoders 280, 282, 284 or 286 is active for enabling one of the gates 228, 240, 256 or 272 to provide base and displacement information on line 302 and register stage information for decoding purposes on line 304 to D2 address generator 40. How the D1 and D2 address generators 38 and 40, respectively respond to this information is to be described shortly.

The instruction address generator 26 (FIGS. 4A, 4B, 4F and 4G) functions as follows. It is to be remembered, that only one instruction fetch may exist in the decode and address generation register 10 during a given cycle. If this occurs, it is indicative that a branch instruction is to occur, and this branch instruction request is provided on the cable 296 via whichever one of the gates 224, 236, 252 or 268 is enabled, as previously described. The displacement field of the branch instruction request is provided via cable 306 to a first input of an adder 308. The base field of the branch instruction request is provided via cable 310 to the general purpose registers as an address, with the data stored at this address in the general purpose registers being provided via cable 312 to a second input of the adder 308 to be added to the displacement input provided on cable 306. The resultant sum is the address of the requested branch instruction in the instruction cache 4. The validity bit is provided on line 314 as a valid branch signal to the first input of an AND gate 316. During the previous cycle of operation the validity bit was inactive, causing the AND gate 316 to be inactive, and in turn causing an AND gate 318 to be inactive. The inactivity of AND gate 316 causes an inverter 320 to provide an active output to the input of an AND gate 322, and in response to the clocking pulse CL-B the AND gate 322 provides an active input to the ONE side of a flip-flop 324, with the ONE output line therefrom being active on line 325 for enabling the AND gate 316 on the next cycle as well as enabling gates 326, 328, 330, 332, 334 and 336. The active state of line 325 is also the ONE side of a dual gate 338 and the input of an inverter 340, the output of which is provided to the other side of dual gate 338. The active signal on line 325 concurrent with clocking pulse time CL-A permits gate 338 (FIG. 4C) to provide an active input to the ZERO side of a flip-flop 341 for providing an active condition on output lines 342 and 344 thereof. The sum signal from the adder 308 is passed by the enabled gate 328 to the input of the enabled gate 330 for providing the branch instruction address to the instruction cache 4. The branch instruction address from gate 328 is also provided as an input to a gate 346. The line 344, as previously set forth, is active at this time and is provided to a first input of an AND gate 348, and in response to the provision of the clocking pulse CL-B, the output of the AND gate 348 becomes active enabling gate 346 to pass the branch instruction address to a branch address register 350 for storing same. When the validity bit on line 314 is active, indicating that a branch instruction is to occur, the AND gate 316 provides an active output since line 325 was active, thereby disabling AND gate 322 via the inactive inverter 320. At the same time, AND gate 318 becomes active in response to the clocking pulse CL-B, setting the flip-flop 324 to the ZERO state thereby making line 325 inactive and disabling the previously enabled gates.

At the same time that the branch instruction address is made available to the instruction cache 4 via the gate 330, the address in the instruction counter 352 (FIG. 4C) is incremented by an amount of four by the incrementing device 354, and this new instruction address is provided via a cable 356 to the input of gate 332. The active state of line 325 enables the gate 322 to pass the new instruction address to the instruction cache 4 where the "next instruction" is defined as the "next instruction" to be executed in case the branch is not taken. In this manner, the "branch target" and the "next instruction" are generated, and when the clocking pulse CL-B is provided during the next address generation cycle, the "next instruction" is provided from the instruction cache 4 to a gate 358, which provides the "next instruction" at the clocking pulse time CL-B to a "next instruction" register 360. The "branch target" instruction from the instruction cache 4 is provided to a gate 362, and at the clocking pulse time CL-B is provided to a "branch target" register 364. Thus, the next two possible instructions are stored to wait for a decision by one of the Execution Logic Boxes A, B, C, or D as to whether the branch should be taken or not.

An "idle cycle" follows as far as an "instruction fetch" is concerned. Near the end of the instruction fetch address generation cycle flip-flip 341 is in its ZERO state as previously described, such that wires 342 and 344 are active, thus enabling the AND gate 348, as previously described, such that when the clocking pulse CL-B occurs the gate 346 is enabled for providing the branch address to the register 350. In this manner, the branch address is saved in case the branch is taken. When flip-flop 324 is set to the ZERO state, as previously described, gate 326 is disabled, thereby preventing a "multi-instruction word" from being transmitted to the register 10 via a gate 365 at the following clock pulse time CL-A.

The decision as to whether the "branch target" in register 364 or the "next instruction" in register 360 is to be provided to the decode and address generation register 10 is made in the "idle instruction" cycle by one of the Execution Logic Boxes A, B, C or D. How this decision is reached is as follows. If the branch is to be taken, wire 366 is made active during the idle instruction cycle. The active state of line 366 is provided to one input of a dual gate 368 (FIG. 4G) and is inverted by an inverter 370 and applied to the other input of the dual gate 368. At the clocking pulse time CL-B the active state of line 366 is provided to the ONE side of a flip-flop 372 and the inactive state is applied to the ZERO side of the same flip-flop. In response thereto, the ONE output of the flip-flop on line 374 becomes active and the ZERO side of the flip-flop on line 376 becomes inactive. The active state of line 374 enables a gate 377 and a gate 378. The enabling of gate 377 permits the "branch target instruction" to be passed to gate 365 and at clocking pulse time CL-A to cable 8 for provision to the decode and address generation register 10. Gate 378 is also enabled in the event the branch is taken, such that the instruction counter may be updated with the branch address. The branch address in register 350 is provided via the gate 378 to cable 379 for provision to the input of a gate 380. At clocking pulse time CL-A gate 380 passes the branch address for updating the instruction counter 352. As previously set forth, the output of instruction counter 352 is then incremented by four by the incrementing device 354 with the output thereof being provided via the cable 356 to gate 332 and to a gate 382.

If the branch is not taken, the flip-flop 372 has its ONE output inactive and its ZERO output active in response to the line 366 being inactive. The active state of line 376 is provided to the gating input of a gate 384, for passing the contents of register 386 to the input of gate 380 for updating the instruction counter 362 at clocking pulse time CL-A. The two low order bits are at 160. The active state of line 376 also enables a gate 390 for passing the "next instruction" stored in register 360 to cable 8 and to the decode and address generation register 10 via enabled gates 326 and 364.

The operation of a data fetch is now described relative to the D2 address generator 40. The data fetch relative to address generator 40 is limited to one data fetch in a given cycle, with there also being a limitation of one data fetch in a given cycle relative to the D1 address generator 38. Accordingly, one and only one of the gates 228, 240, 256 and 272 are enabled during the given cycle for initiating the data fetch by applying the displacement field and the base field of an instruction to the cable 302.

The displacement field of the instruction is then provided to the cable 302 and, the base field of the instruction is provided to the cable 392. The base field of the instruction on cable 392 is applied to the general purpose registers (not shown) as an address, and the data stored in the general purpose registers at this address is applied via a cable 394 to an adder 396 for addition with the displacement field of the instruction on cable 390. The resultant sum in the adder 396 is applied to an address register 398, with the address therefrom being applied to cables 400 and 402. The address on the cable 402 is applied via the gate 336 to the data cache 6. As previously set forth the gate 336 is enabled whenever the flip-flop 324 (FIG. 4A) is in the ONE state. The data stored in the data cache 6 at the address indicated on cable 402 is then applied via cable 404 to a data register 406. The address on cable 400 and the data in register 406 as manifested on cable 408 are each provided via a cable 410 to the respective inputs of gates 412, 414, 416 and 418. The decoder 420 determines which of the gates 412, 414, 416 or 418 is enabled in response to the two bit code on cable 304 which designates which requester stage 12, 14, 16 or 18 is providing data to generator 40. For example, if the data fetch is initiated from register 12, the gate 228 is enabled by decoder 280 and the two bit signal "00" from register 212 is passed to the decoder 420, and in response thereto the ZERO line becomes active for enabling an AND gate 422, and at the clocking pulse time CL-B the output of the gate 422 becomes active for enabling gate 412 to pass the address and data information on cable 410 to holding register 424. If the data fetch is initiated from address register stage 14, decoder 282 enables gate 240 to pass the two bit code "01" from register 214 to decoder 420 for activating line 1 such that an AND gate 426 is enabled, and at clocking pulse time CL-B the output thereof is active for enabling gate 414 to pass the address and data information on cable 410 to a holding register 428. If the data fetch is initiated by register stage 16, decoder 284 enables gate 256 to pass the two bit code "10" from register stage 16 to the decoder 420, for activating output line 2 for enabling AND gate 430 such that at clocking pulse time CL-B the output thereof becomes active for enabling gate 416 to pass the address and data information on cable 410 to a holding register 432. If address register stage 18 initiates the data fetch, the decoder 286 enables gate 272 to pass the two bit code "11" from register 218 to the decoder 420 for activating output line 3 thereof for enabling AND gate 434 such that at clocking pulse time CL-B the output thereof becomes active for enabling a gate 418 to pass the address and data information on cable 410 to a holding register 436. The output from the registers 424, 428, 432, and 436 are applied to gates 438, 440, 442 and 444, respectively, such that at clocking pulse time CL-A the contents of the respective registers are gated therefrom. The address and data information from gate 438 is applied to a cable 446 and therefrom to a cable 448 for application to cables 450 and 452 on which the data and address information respectively are provided to Execution Logic Box A. The address and data information from gate 440 is applied to a cable 454 and therefrom to a cable 456 for application to cables 458 and 460 on which the data and address information respectively are provided to Execution Logic Box B. The address and data information from gate 442 is provided to cable 462 and therefrom to cable 464 for application to cables 466 and 468 for provision of data and address information respectively to Execution Logic Box C. The address and data information from gate 444 is provided to cable 470 and therefrom to cable 472 for application to cables 474 and 478 as data and address information respectively to Execution Logic Box D.

D1 address generator 38 is identical to address generator 40, therefore the detailed operation thereof will not be explained. Data comprised of the displacement field and the base field of the instruction are provided from cable 298 to cables 480 and 482, respectively. The base field of the instruction on cable 482 is provided to the general purpose registers (not shown) as an address, and the data stored at this address is provided on cable 484 as an input to an adder in the address generator 38 for summation with the displacement on cable 480. The result of this addition is utilized as an address on cable 486 which is gated through gate 334 to fetch such data from the data cache 6, with the data then being provided on cable 488 to the address generator 38. In response to the two bit code word on cable 300, the address and data information is then gated to hold registers identical to those set forth in address generator 40, with the contents of these registers then being provided on output cables 492, 494, 496 and 498 from address generator 38. The address and data information on cable 492 is coupled to cable 448 for provision to Execution Logic Box A. The address and data information on cable 494 is coupled to cable 456 for application to Execution Logic Box B. The address and data information on cable 496 is coupled to cable 464 for application to Execution Logic Box C. The address and data information on cable 498 is coupled to cable 472 for application to Execution Logic Box D. How the respective Execution Logic Boxes respond to the address and data information from address generators 38 and 40, as well as to operand information from the decode and address generation register 10 is to be described shortly.

The starting point for the execution of instructions in the Execution Logic Boxes A, B, C and D is similar to that for determining the starting point of instructions from the decode and address generation register 10. That is, the two low order bits from register 160 are used to derive the starting point. The two low order bits from register 160 are provided on cable 500 to a gate 502 which gates through the two bit code at clocking pulse time CL-B to a holding register 504. It is seen that the holding register 504 is holding the two low order bits in the same time frame as the holding registers 88, 90, 92 and 94 are holding the operation code from the respective stages of the decode and address generation register 10. At clocking pulse time CL-A a gate 506 is enabled to transfer the contents of holding register 504 to a register 508. A decoder 510 decodes the two bit code and provides a decoded four line output indicative of the two bit code. The contents of the holding register 504 were transferred for decoding purposes at the same time that the contents of the holding registers containing the respective operation codes are provided to the Execution Logic Boxes. If the "0" output of decoder 510 is active on line 512 it means that the instruction sequence begins with Execution Logic Box A; if the "1" output is active on line 513 it means that the instruction sequence begins with Execution Logic Box B; if the "2" output is active on line 515 it means that the instruction sequence begins with Execution Logic Box C; and if the "3" output is active on line 517 it means that the instruction sequence begins with Execution Logic Box D. With reference to Execution Logic Box A, the active signal on line 512 is provided to the input of an inverter 514, the first input of AND gate 516, a first input of an OR gate 518, a first input of an OR gate 520 and a first input of an OR gate 522. Since line 512 is active, the output of inverter 514 is inactive and does not contribute to an active output from an OR gate 524 and accordingly does not enable a gate 526. The active state of the line 512 does not contribute to an active output of an inverter 528 (Box B) and accordingly in response thereto an OR gate 530 does not provide an active output such that the gate 532 is enabled. In a similar manner the active state of line 512 provides an inactive output from inverter 532 (Box C) and this does not contribute to the enabling of a gate 534. In a like manner the active state of line 512 provides an active input to inverter 536 and the inactive output therefrom does not contribute to the enabling of a gate 538. The gates 526, 532, 534 and 538 respond to a provided condition code. The condition code, as is known in the art, is a code which is indicative of a completed operation.

The condition code is brought from the program status word unit to a gate 542 (FIG. 4N) which is enabled at clocking pulse time CL-A, for provision to a register 544 for storing the condition code. The stored condition code is then provided to a cable 546 and therefrom to cables 548 and 550 for provision to the Execution Logic Box A and the input of gate 526, respectively. If gate 526 is enabled, the condition code is passed on to Execution Logic Box B, in the following manner. Gate 526 is enabled under the following conditions. First, the validity bit is "0" as indicated on line 552 at the "0" output of register 112. The validity bit is "0" in the case of a non-valid instruction, as previously set forth, and this validity bit is provided to the second input of the OR gate 524, thereby providing an active output on the output line 554 therefrom, thereby enabling the gate 526 to provide the condition code on line 556. The second way the gate 526 is enabled, is if Execution Logic Box A does not contain the starting instruction of the group. This occurs if wire 512 is inactive, which in turn provides an active output from the inverter 514, which in turn provides an active output from OR gate 524 on line 554 for enabling the gate 526. Thus, under these two conditions, the condition code from the program status word is passed by the gate 526, thereby bypassing the Execution Logic Box A.

Figure 5A:
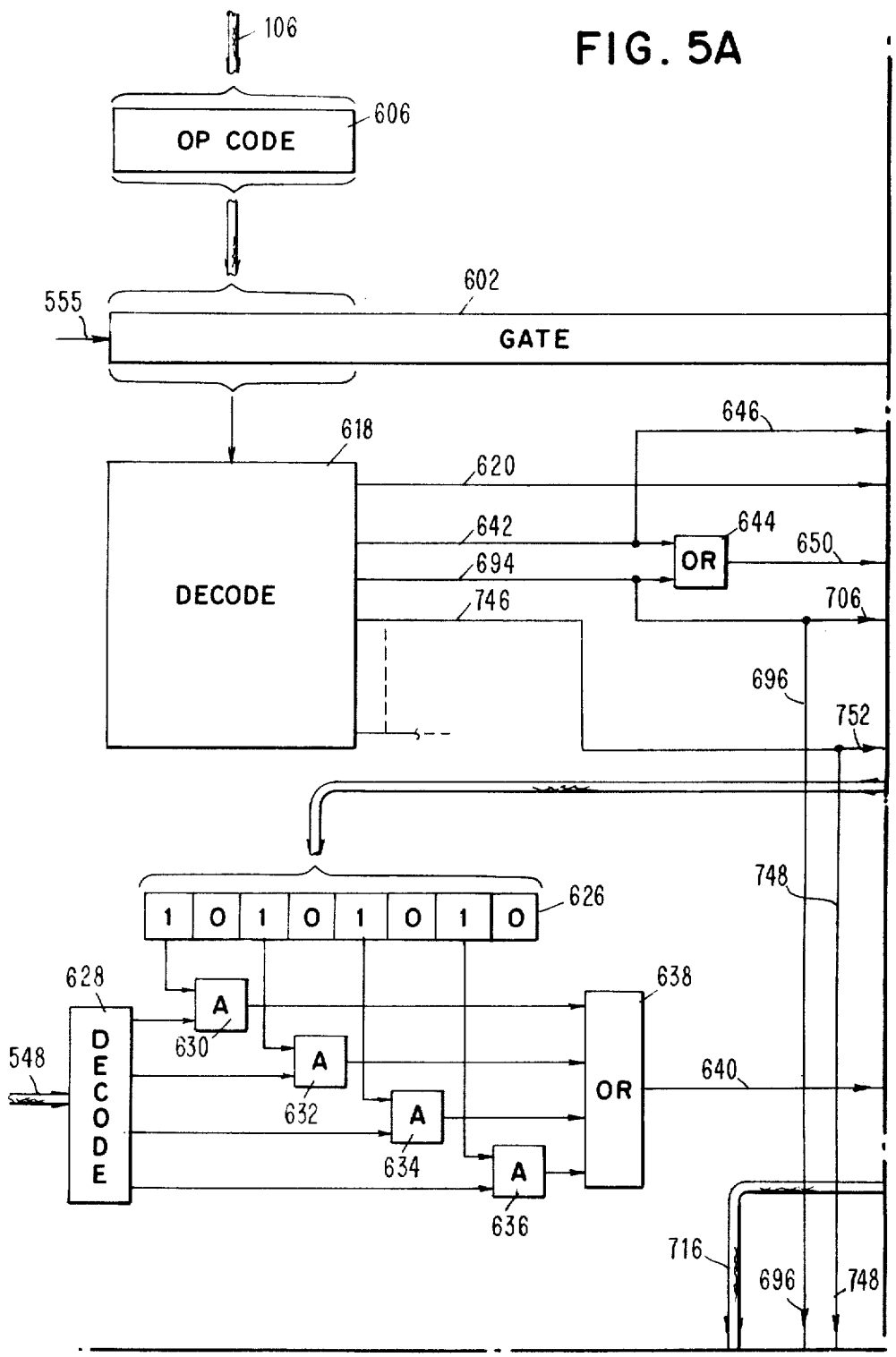
Figure 5E:
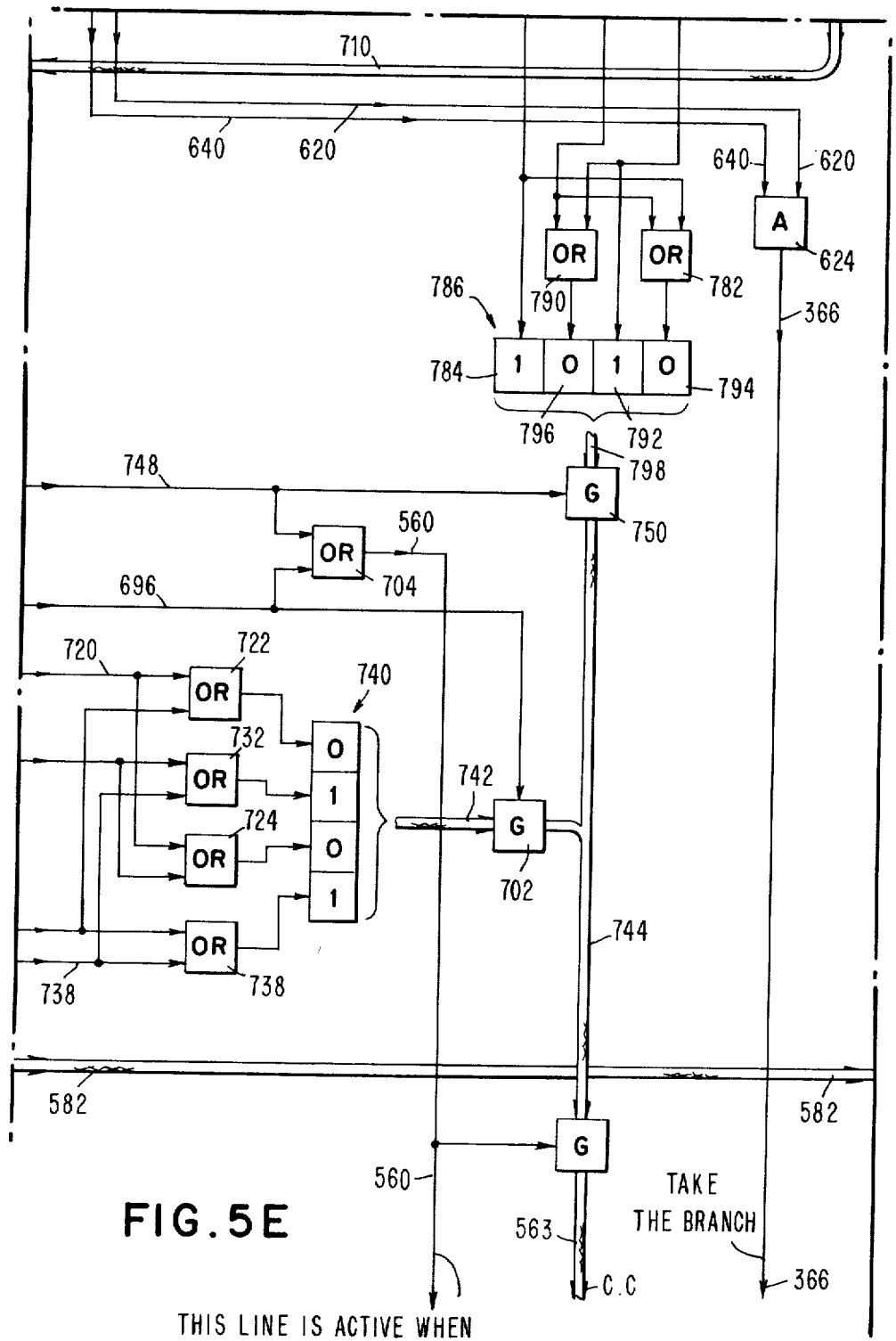
Figure 5F:
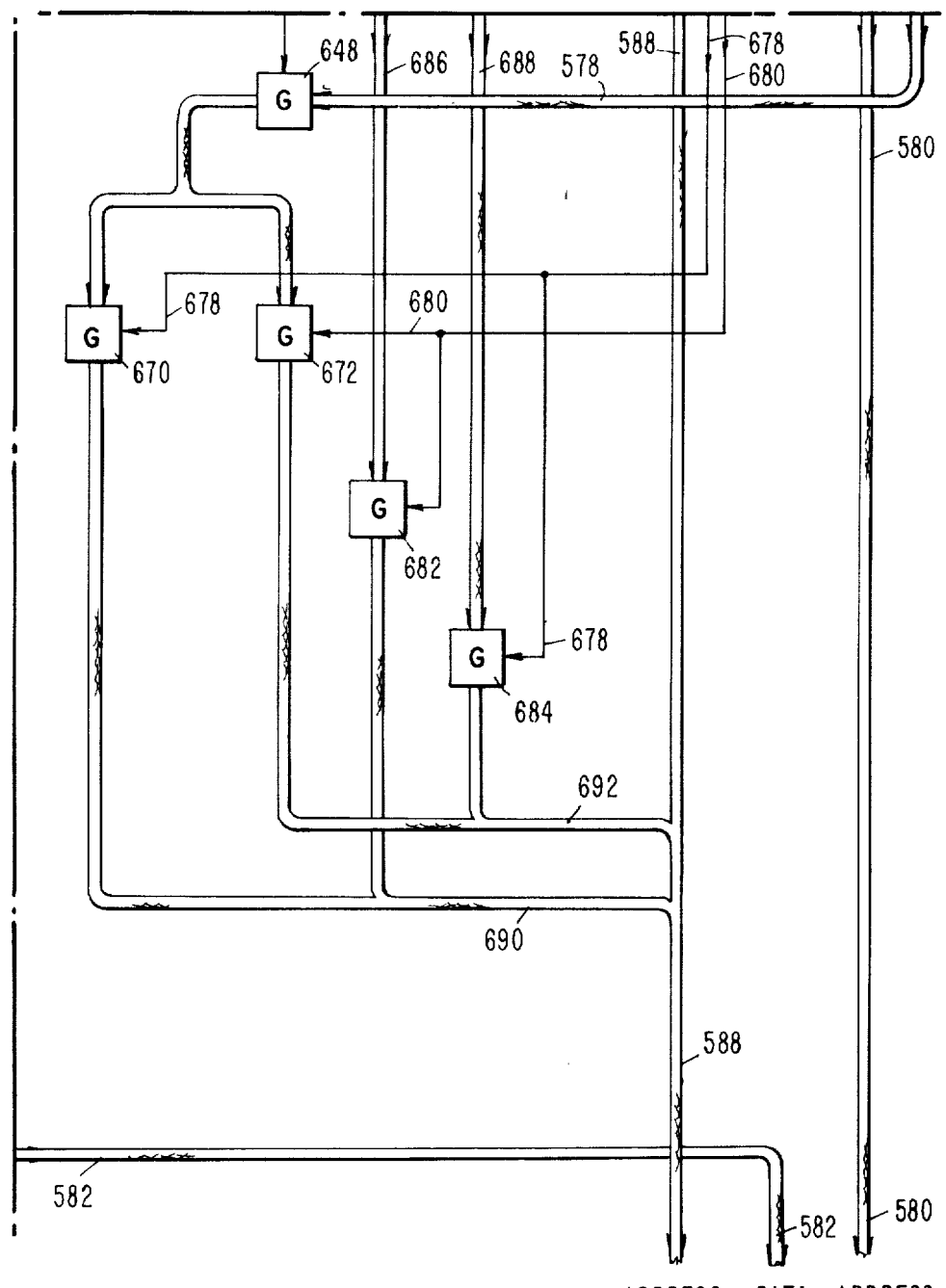

If on the other hand, the instruction provided to Execution Logic Box A is a valid instruction, this is indicated by the validity bit being "1", and line 148 being active, indicating a "type one" instruction. These two signals are provided to AND gate 553, with the active output therefrom on line 555 being an enabling signal for Execution Logic Box A. The function of this signal will be explained in more detail relative to FIG. 5. This, coupled with line 512 being active means that a condition code may be generated by the Execution Logic Box A. The active state of wire 512 is inverted by the inverter 514 providing an inactive state to OR gate 524, the "0" side of the register 112 is inactive, providing an inactive input on line 552 to OR gate 524, and a line 560 from Execution Logic Box A which is indicative of the generation of a new code, as will be set forth in a more detail relative to FIG. 5, is active for providing an inactive output from inverter 562 such that the output from OR gate 524 on line 554 is inactive for disabling the gate 526. The active state of line 512 is applied to an AND gate 516, as is the active state of line 558 and 560, such that the AND gate provides an active output for enabling a gate 564 to pass the new condition code on cable 563 to cable 556 for provision to Execution Logic Box B and the input of gate 532. Like logic networks as described above are associated with Execution Logic Boxes B, C and D for either passing the condition code provided to the respective Execution Logic Box, or for generating a new condition code for provision to the following network. In any event, the final condition code is provided on cable 568 for provision to a gate 570 which is enabled at clocking pulse time CL-B for provision to cable 572 and therefrom to the program status word unit for updating the condition code.

Addresses to the general purpose registers for fetching data therefrom, and the data fetched for the respective Execution Logic Boxes are provided on the group of cables indicated at 574. The addresses from and data to Execution Logic Box A, to and from the general purpose registers are provided on cables 576 and 578, respectively from the group of cables 574. Like address and data cable inputs and outputs are provided the remaining Execution Logic Boxes B, C and D. Address and data information is also provided to the general purpose registers from Execution Logic Box A on cables 580 and 582 via a gate 584 which is enabled at clocking pulse time CL-B, with the output from the gate being provided on cable 586 to the general purpose registers. Like address and data information from Execution Logic Box B, C and D are also provided to the gate 584.

In the event of a store operation by Execution Logic Box A, address and data information is provided on cable 588 to a cable 590 for provision to a gate 592. Similar address and data information is provided from the remaining Execution Logic Boxes B, C and D to the cable 590 for provision to the gate 592. At clocking pulse time CL-B the gate 592 is enabled for providing the address and data information for storage to a Store Data and Address Register (SDA-1) 594 with the output of this register being provided to the input of a gate 596 which is enabled at clocking pulse time CL-A for providing the information to a second Store Data and Address Register (SDA-2) 598, with the output of this register being provided on cable 600 to the data cache 6.

Refer now to FIG. 5 which is a detailed block diagram of Execution Logic Box A. Execution Logic Boxes B, C and D are similar and operate in a like manner. The Execution Logic Boxes perform an arithmetic and logic unit type function by concurrently executing the "type one" instructions. The OP code on cable 106 and the R1 and R2 fields on cables 108 and 110, respectively, are applied to registers 606, 608, and 610, respectively.

The data and address information from one of the D1 address generator 38 or D2 address generator 40 is applied to registers 612 and 614, respectively. A gate 602 is connected to the respective outputs of each of the aforementioned registers. An enable signal is provided on a wire 555 to the gate for enabling same. As previously set forth, the wire 555 is active whenever the instruction in register stage 12 is a valid "type one" instruction. If the instruction is a "non-type one" or an invalid instruction, the wire 555 is inactive and the gate is disabled. The OP code in register 606 is provided to a decoder 618 which decodes the instructions in order to perform operations with the information stored in the registers 608, 610, 612 and 614, respectively. A plurality of instructions are decoded by the decoder 618, and the execution of exemplary groups of such instructions is described relative to the operation of Execution Logic Box A. It is to be understood that other such instructions may be performed in a like manner, and that Execution Logic Boxes B, C and D also operate in a like manner in response to the provided OP code, R1 and R2 fields, and the data and address from the respective address generators.

The first such instruction is "branch on condition". When this instruction is called for by the OP code, wire 620 (FIG. 5A) becomes active, thereby enabling gate 622 and AND gate 624 (FIG. 5E). The contents of register 608, the R1 field, is then provided through gate 622 to a register 626 for comparison with the condition code on cable 548. A decoder 628 decodes the condition code, with the four line output of the decoder being provided to the respective inputs of AND gates 630, 632, 634 and 636, with the second inputs of each of these gates being connected to respective "1" outputs of the four stages of the register 626. The output of each of the aforementioned gates is connected to the respective inputs of an OR gate 638, with the output line 640 therefrom being active whenever there is an active output from one of the AND gates connected to the input thereof. The wire 640 is connected to the second input of the gate 624, and in response to the active state of each of the input lines the output line 366 therefrom becomes active indicating that the branch should be taken. As previously set forth with respect to FIG. 4, this "take the branch" signal enables the "branch target instruction" stored in register 364 (FIG. 4B) to be provided for provision to the decode and address generation register 10 for executing the branch instruction on the following cycle.

Figure 4S:
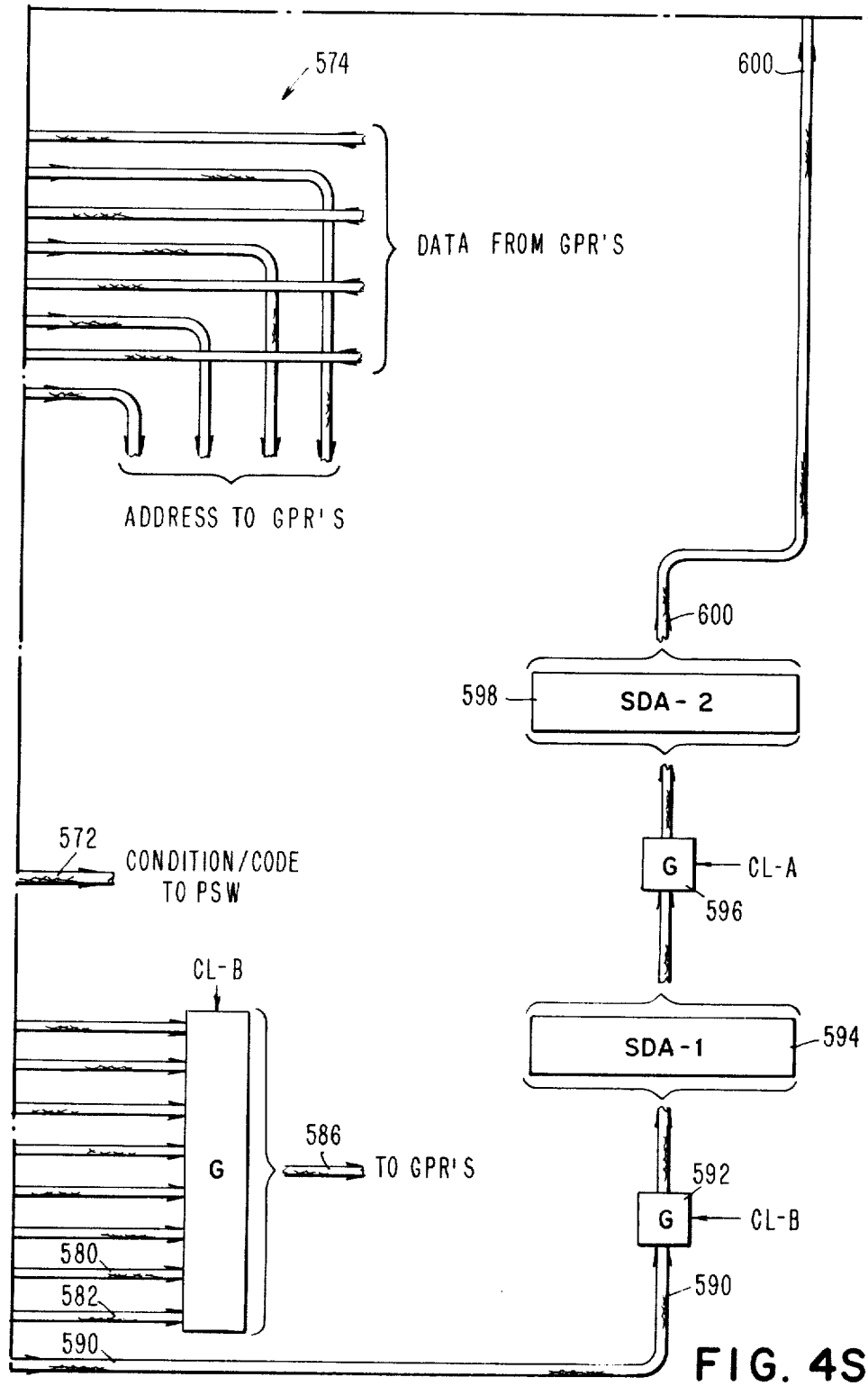

The second instruction to be described in "store half word", with this instruction being called for when the line 642 from decoder 618 becomes active. Line 642 is connected to a first input of a OR gate 644 and to a line 646 which connects to the enabling input of a gate 648. The output line 650 from the OR gate 644 is connected to the enabling input of a gate 660. The R1 field in register 608 is passed by the enabled gate 660 to cable 662 which extends to cables 576 and 580, which provides the R1 field to the general purpose registers as a first address, with the data to this address then being provided back to the Execution Logic Box via cable 578 which connects to the input of the gate 648. The data passed by the enabled gate 648 is provided to an output cable 664, with this cable extending to cables 666 and 668 which are provided as inputs to gate 670 and 672. Two bits from the address register 614 are provided on a line 674 to decoder 676, with output line 678 and 680 therefrom being provided as enabling inputs to gate 670 and 672, as well as enabling inputs to gate 682 and 684. The inputs to gate 682 and 684 are data from register 612 via cables 686 and 688. The enabled gates 670, 672, 682 and 684 then provide data information via cables 690 and 692 to cable 588 for provision as address and data to the data cache 6 via register 594 and 598 (FIG. 4S) as previously described relative to a "store operation".

The third instruction is "add" which is executed when line 694 from decoder 618 becomes active. Line 694 extends to line 696 which enables gates 698, 700, 702 and a first input of OR gate 704 which calls for setting the condition code on line 560, by providing an enabling signal for a new condition code to the following Execution Logic Boxes as set forth in the explanation relative to FIG. 4. The active state of line 694 also extends to line 706 which enables gate 708 for passing data from register 612 to output cable 710 therefrom to the input of gate 698, which is enabled at this time, and to input cable 712 of an adder 714. OR gate 644 provides an active signal on output line 650 in response to the active state of line 694 for enabling gate 660 to pass the R1 field from register 608 to cable 662 for provision to cable 576 and 580 as addresses to the general purpose register with the data at this address being provided as an input on cable 578 to cable 716 as a second input to adder 714 for addition with the data from register 612 on cable 712. The summation from the adder 714 is provided to a register 716, with this sum being provided to a test for ZERO network 718 and to cable 720. The sum is passed through the enabled gate 700 to output cable 582 with the sum being data which is then provided to the general purpose registers. The test for ZERO unit provides an active signal on line 720 when the sum is ZERO indicating the condition code should be set to "00" with this signal being provided to first inputs of OR gates 722 and 724. The test for ZERO signal is also provided to an inverter 726 with the output therefrom being provided to a first input of an AND gate 728. The second input to the AND gate 728 is from a register stage 730 in register 716 which is indicative of the sum being greater than "0" with this signal being provided to a second input of the AND gate 728, with the output therefrom being provided to the first input of an OR gate 732. If the sign of the summation is negative this is indicated by register stage 734 providing an active output to the second input of OR gate 722 and to a first input of an OR gate 736. Overflow from the adder 714 is indicated by line 738 therefrom being active with this active signal being provided as a second input to the OR gate 736 and a second input to OR gate 732. The output of the OR gates 722, 732, 724 and 736 are provided to a register 740, with the output of the register 740 being provided via cable 742 to the gate 702 which is enabled at this time. The new condition code is passed by the gate 702 to the cable 563 for provision therefrom to Execution Logic Box B.

The fourth and final instruction to be described is the "compare logical immediate" instruction which is executed when the line 746 becomes active. The line 746 extends to a line 748 which connects to the second input of the OR gate 704 for once again providing an active set condition code signal on line 560 for the provision of the new condition code for the following Execution Logic Boxes. The active signal on line 748 is also provided to a gate 750 for enabling same. The active state of line 746 also extends to a line 752 for enabling gates 754 and 756 for passing the contents of register 608 and 610 to a register 758 which provides an output therefrom on cable 760 to a first input of comparison network 762. The active state of line 752 also extends to a first input of AND gates 764, 766, 768 and 770 which have the second inputs thereof connected to the respective outputs from the decoder 676. The outputs from AND gates 764, 766, 768 and 770 are provided as enabling inputs to gates 772, 774, 776 and 778 to enable them to pass the selected contents of the data register 612 to the second input of the comparator 762. If the operand from register 758 is low, output line 780 from the comparator 762 is provided to a first input of OR gate 782 and to a stage 784 of register 786. If the operand provided to the second input of comparison network 762 on cable 781 is low the line 788 is active and this signal is provided to a first input of an OR gate 790 and to register stage 792 of the register 786. If the operand on the first and second inputs of the comparator 762 are equal, line 794 becomes active and this line is applied to the second inputs of the OR gates 782 and 790, with the output from these OR gates being provided to register stage 794 and 796, respectively. The output from register 786 is provided via cable 798 to gate 750, which is enabled at this time, with the output therefrom being provided as the new condition code to output cable 563 for provision to the following Execution Logic Boxes.

FIG. 6A thru 6C comprises a timing chart for three "multi-instruction words", A, B and C. Word B includes a branch and word C includes a store instruction. The timing chart is for six cycles of operation, and sets forth the sequence of operation during the clocking pulse times CL-A and CL-B.

Industrial Applicability

It is an object of the invention to provide an improved multiple instruction execution system for a computing machine.

It is another object of the invention to provide an improved multiple instruction execution system for a computing machine wherein the multiple instructions may be concurrently executed.

It is yet another object of the invention to provide a multiple instruction execution system for a computing machine in which multiple instructions of a given type may be concurrently executed.

It is still another object of the invention to provide a multiple instruction execution system in which four instructions may be concurrently executed and in which there may be one instruction fetch, two data fetches and one store operation.

Having thus described my invention, what I claim as new, and desire to secure by Letters Patent is:

1. A method of concurrently executing n instructions in parallel, where n is an integer >1, on different sets of data, said method comprising the steps of:
    compiling said instructions into groups of n different instructions for storage in a memory device, with no more than a fixed number of data and instruction fetches, and a fixed number of store operations being permitted in a group, and any branch instruction always being the last instruction in the group;
    storing one group at a time of said instructions in a first storage device;
    storing different sets of data in a second storage device;
    retrieving said one group of instructions from said first storage devices; and
    executing in parallel each of the retrieved n instructions in said one group concurrently in n different execution devices, with each of said n instructions utilizing a different set of the stored data in said second storage device for purposes of instruction execution.

2. A method of executing instructions in a computing machine, said method comprising the steps of:
    compiling said instructions into groups of n, where n is an integer >1, for storage in a memory device, with no more than a fixed number of data and instruction fetches, and a fixed number of store operations being permitted in a group, and any branch instruction always being the last instruction in the group;
    fetching one group of instructions at a time from said memory device;
    storing said one group of fetched instructions in a first storage device;
    executing said n instructions concurrently in n different execution logic devices in response to retrieving the n stored instructions from said first storage device.

3. A method of concurrently executing instructions of a given type in a computing machine, said method comprising the steps of:
    compiling said instructions into groups of n, where n is an integer >1, instructions, for storage in a memory device, with no more than a fixed number of data and instruction fetches, and a fixed number of store operations being permitted in a group, and any branch instruction always being the last instruction in the group, with no more than one of said instructions in a group being other than said given type;
    fetching one group of instructions at a time from said memory device;
    storing said one group of fetched instructions in a storage device, with any one of said instructions in the group that is other than said given type being stored in a fixed location;
    retrieving the stored group of instructions from said storage device; and
    executing concurrently the said n instructions that are of said given type.

4. A method of executing instructions of a given type in a computing machine, said method comprising the steps of:
    compiling said instructions into groups of n, where n is an integer >1, instructions, with each group of instructions being defined as a unit of work, with no more than a fixed number of data and instruction fetches, and a fixed number of store operations being permitted in a group, and any branch instruction always being the last instruction in the group;
    storing one group of instructions at a time in a first storage device;
    responding to the stored group of n instructions in said first storage device to determine if any data or branch instruction fetches are called for; and
    executing concurrently said n instructions in n different execution logic devices in response to fetching the stored instructions in said first storage device, and fetched data, if any.

5. In apparatus for computing instructions compiled into groups of n, where n is an integer >1, instructions, with no more than a fixed number of data and branch instruction fetches and a fixed number of store operations being permitted in a group, and any branch instruction being the last instruction in the group, the combination comprising:
    an instruction cache in which said groups of n instructions and said branch instructions are stored;
    a data cache in which data to be used in the execution of said instructions is stored;
    a group of general purpose registers in which data read from said data cache is stored;
    an n stage register in which a group of n instructions at a time read from said instruction cache is stored;
    an instruction address generator for generating branch instruction fetches in response to a branch instruction being stored in said n stage register;
    at least one data address generator for generating data fetches from said general purpose registers in response to a data fetch instruction being stored in said n stage register;
    a switching and logic unit responsive to said n instructions in said n stage register for routing any instruction or data fetches to said instruction and data address generators, respectively, with said address generators being operative with said instruction cache, data cache and general purpose registers; and n execution logic means for responding to each of said n instructions and said switching and logic units and address generators for concurrently executing each of said n instructions, and performing said store operation in said data cache when called for.

6. In apparatus for computing instructions of a given type compiled into groups of n, where n is an integer ≧4, instructions, with no more than one instruction being other than said given type and said one instruction being at a fixed position from one group to the next, with two data fetches and one branch instruction fetch and one store operation being permitted in a group, with any branch instruction fetch being the last instruction in the group, the combination comprising:

an instruction cache wherein said groups of n instructions including branch instructions are stored;

a data cache containing data necessary to perform said instructions;

an n stage register in which a group of n instructions at a time is stored from said instruction cache, with any instruction other than said given type being stored in a predetermined one of said n stages;

a first gating means responsive to the instruction stored in said predetermined one of said n stages for determining if the instruction is of said given type, and if so permitting same to be processed by said apparatus;

a second gating means responsive to each of said n instructions for determining which instructions, if any, contains a branch instruction fetch;

a third gating means responsive to each of said n instructions for determining which instruction, if any, contains a first data fetch;

a fourth gating means responsive to each of said n instructions for determining which instruction, if any, contains a second data fetch;

a group of general purpose registers in which addresses and data needed for executing said instructions are stored;

an instruction address generation means operative with said general purpose registers and responsive to said second gating means for initiating a branch instruction fetch from said instruction cache;

a first data address generation means operative with said data cache and general purpose registers and responsive to said third gating means for fetching addresses and data;

a second data address generation means operative with said data cache and general purpose registers and responsive to said fourth gating means for fetching addresses and data; and n execution logic means, each operative with one of said n stages of said n stage register and said first and second data and address generators for concurrently executing the called for valid instructions of said given type including called for data fetches and store operations, if any, with the address and data called for by said store operation being provided to said data cache.

* * * * *